US007517578B2

(12) United States Patent
Raksha et al.

(10) Patent No.: US 7,517,578 B2
(45) Date of Patent: *Apr. 14, 2009

(54) METHOD AND APPARATUS FOR ORIENTING MAGNETIC FLAKES

(75) Inventors: Vladimir P. Raksha, Santa Rosa, CA (US); Paul G. Coombs, Santa Rosa, CA (US); Charles T. Markantes, Santa Rosa, CA (US); Dishuan Chu, Rohnert Park, CA (US); Jay M. Holman, Santa Rosa, CA (US); Alberto Argoitia, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 675 days.

This patent is subject to a terminal disclaimer.

(21) Appl. No.: 11/022,106

(22) Filed: Dec. 22, 2004

(65) Prior Publication Data

US 2005/0106367 A1 May 19, 2005

Related U.S. Application Data

(63) Continuation-in-part of application No. 10/386,894, filed on Mar. 11, 2003, now Pat. No. 7,047,883.

(60) Provisional application No. 60/410,546, filed on Sep. 13, 2002, provisional application No. 60/410,547, filed on Sep. 13, 2002, provisional application No. 60/396,210, filed on Jul. 15, 2002.

(51) Int. Cl.

| | |
|---|---|
| ***B41M 5/00*** | (2006.01) |
| ***B44C 1/17*** | (2006.01) |
| ***G03G 7/00*** | (2006.01) |
| ***B42D 15/00*** | (2006.01) |
| ***B42D 15/10*** | (2006.01) |
| ***G09C 3/00*** | (2006.01) |

(52) U.S. Cl. .................... 428/195.1; 428/900; 428/916; 283/72; 283/79; 283/93; 283/901; 283/902

(58) Field of Classification Search ............. 428/195.1, 428/900, 916; 283/72, 79, 93, 901, 902
See application file for complete search history.

(56) References Cited

U.S. PATENT DOCUMENTS 2,570,856 A 10/1951 Pratt et al. ..................... 41/32

(Continued)

FOREIGN PATENT DOCUMENTS

DE 4212290 5/1993

(Continued)

OTHER PUBLICATIONS

U.S. Appl. No. 10/243,111, filed Sep. 13, 2002, Argoitia et al.

(Continued)

*Primary Examiner*—Callie E Shosho
*Assistant Examiner*—David J Joy
(74) *Attorney, Agent, or Firm*—Allen, Dyer, Doppelt, Milbrath & Gilchrist, P.A.

(57) ABSTRACT

Apparatus and related methods align magnetic flakes in a carrier, such as an ink vehicle or a paint vehicle to create optically variable images in a high-speed, linear printing operation. Images can provide security features on high-value documents, such as bank notes. Magnetic flakes in the ink are aligned using magnets in a linear printing operation. Selected orientation of the magnetic pigment flakes can achieve a variety of illusive optical effects that are useful for decorative or security applications.

12 Claims, 18 Drawing Sheets

U.S. PATENT DOCUMENTS

| | | | | |
|---|---|---|---|---|
| 3,123,490 | A | 3/1964 | Bolomey et al. | 106/291 |
| 3,610,721 | A | 10/1971 | Abramson et al. | 350/3.5 |
| 3,627,580 | A | 12/1971 | Krall | 117/238 |
| 3,633,720 | A | 1/1972 | Tyler | 400/105 |
| 3,676,273 | A | 7/1972 | Graves | 161/3 |
| 3,790,407 | A | 2/1974 | Merton et al. | 428/148 |
| 3,791,864 | A | 2/1974 | Steingroever | 117/238 |
| 3,845,499 | A | 10/1974 | Ballinger | 346/74.3 |
| 3,853,676 | A | 12/1974 | Graves | 161/5 |
| 3,873,975 | A | 3/1975 | Miklos et al. | 360/25 |
| 4,011,009 | A | 3/1977 | Lama et al. | 359/571 |
| 4,054,922 | A | 10/1977 | Fichter | 346/74.3 |
| 4,099,838 | A | 7/1978 | Cook et al. | 359/537 |
| 4,197,563 | A | 4/1980 | Michaud | 346/74.3 |
| 4,244,998 | A | 1/1981 | Smith | |
| 4,271,782 | A | 6/1981 | Bate et al. | 118/623 |
| 4,398,798 | A | 8/1983 | Krawczak et al. | 359/573 |
| 4,543,551 | A | 9/1985 | Petersen | 335/284 |
| 4,788,116 | A | 11/1988 | Hochberg | 430/21 |
| 4,867,793 | A | 9/1989 | Franz et al. | 106/415 |
| 4,931,309 | A | 6/1990 | Komatsu et al. | 427/599 |
| 5,079,058 | A | 1/1992 | Tomiyama | 428/40 |
| 5,079,085 | A | 1/1992 | Hashimoto et al. | 428/327 |
| 5,177,344 | A | 1/1993 | Pease | 235/449 |
| 5,186,787 | A | 2/1993 | Phillips et al. | 216/36 |
| 5,192,611 | A | 3/1993 | Tomiyama et al. | 428/354 |
| 5,223,360 | A | 6/1993 | Prengel et al. | 430/39 |
| 5,364,689 | A | 11/1994 | Kashiwagi et al. | 428/195 |
| 5,368,898 | A | 11/1994 | Akedo | 427/510 |
| 5,424,119 | A | 6/1995 | Phillips et al. | 428/328 |
| 5,474,814 | A | 12/1995 | Komatsu et al. | 427/549 |
| 5,613,022 | A | 3/1997 | Odhner et al. | 385/37 |
| 5,624,076 | A | 4/1997 | Miekka et al. | 241/3 |
| 5,627,663 | A | 5/1997 | Horan et al. | 359/2 |
| 5,630,877 | A | 5/1997 | Kashiwagi et al. | 118/623 |
| 5,672,410 | A | 9/1997 | Miekka et al. | 428/148 |
| 5,744,223 | A | 4/1998 | Abersfelder et al. | 428/206 |
| 5,811,775 | A | 9/1998 | Lee | 235/457 |
| 5,991,078 | A | 11/1999 | Yoshitake et al. | 359/567 |
| 6,033,782 | A | 3/2000 | Hubbard et al. | 428/407 |
| 6,043,936 | A | 3/2000 | Large | 359/572 |
| 6,068,691 | A | 5/2000 | Miekka et al. | 106/403 |
| 6,103,361 | A | 8/2000 | Batzar et al. | 428/323 |
| 6,150,022 | A | 11/2000 | Coulter et al. | 428/403 |
| 6,168,100 | B1 | 1/2001 | Kato et al. | 241/1 |
| 6,403,169 | B1 | 6/2002 | Hardwick et al. | 427/548 |
| 6,549,131 | B1 | 4/2003 | Cote et al. | 340/572.1 |
| 6,586,098 | B1 | 7/2003 | Coulter et al. | 428/403 |
| 6,589,331 | B2 | 7/2003 | Ostertag et al. | 106/460 |
| 6,643,001 | B1 | 11/2003 | Faris | 356/37 |
| 6,649,256 | B1 | 11/2003 | Buczek et al. | 428/323 |
| 6,686,027 | B1 | 2/2004 | Caporaletti et al. | 428/195.1 |
| 6,692,031 | B2 | 2/2004 | McGrew | 283/93 |
| 6,692,830 | B2 | 2/2004 | Argoitia et al. | 428/403 |
| 6,749,777 | B2 | 6/2004 | Argoitia et al. | 252/582 |
| 6,749,936 | B2 | 6/2004 | Argoitia et al. | 428/402 |
| 6,751,022 | B2 | 6/2004 | Phillips | 359/577 |
| 6,759,097 | B2 | 7/2004 | Phillips et al. | 427/510 |
| 6,808,806 | B2 | 10/2004 | Phillips et al. | 428/403 |
| 6,815,065 | B2 | 11/2004 | Argoitia et al. | 428/403 |
| 6,818,299 | B2 | 11/2004 | Phillips et al. | 428/403 |
| 6,838,166 | B2 | 1/2005 | Phillips et al. | 428/323 |
| 6,987,590 | B2 | 1/2006 | Phillips et al. | 359/2 |
| 7,029,525 | B1 | 4/2006 | Mehta | 106/31.6 |
| 7,047,883 | B2 | 5/2006 | Raksha et al. | 101/489 |
| 7,300,695 | B2 * | 11/2007 | Argoitia et al. | 428/206 |
| 2003/0190473 | A1 | 10/2003 | Argoitia et al. | 428/403 |
| 2004/0009309 | A1 | 1/2004 | Raksha et al. | 427/598 |
| 2004/0051297 | A1 | 3/2004 | Raksha | |
| 2004/0081807 | A1 | 4/2004 | Bonkowski et al. | 428/195.1 |
| 2004/0094850 | A1 | 5/2004 | Bonkowski et al. | 264/1.34 |
| 2004/0105963 | A1 | 6/2004 | Bonkowski et al. | 428/195.1 |
| 2004/0151827 | A1 | 8/2004 | Argoitia et al. | 427/7 |
| 2005/0037192 | A1 | 2/2005 | Argoitia et al. | 428/323 |
| 2005/0106367 | A1 | 5/2005 | Raksha | |
| 2005/0123755 | A1 | 6/2005 | Argoitia et al. | 428/402 |
| 2006/0035080 | A1 | 2/2006 | Argoitia et al. | 428/402 |
| 2006/0077496 | A1 | 4/2006 | Argoitia | 359/2 |
| 2006/0194040 | A1 | 8/2006 | Raksha et al. | 428/323 |
| 2006/0263539 | A1 | 11/2006 | Argoitia | 427/547 |
| 2007/0058227 | A1 | 3/2007 | Raksha et al. | 359/2 |
| 2008/0069979 | A1 * | 3/2008 | Raksha et al. | 428/29 |

FOREIGN PATENT DOCUMENTS

| | | |
|---|---|---|
| EP | 0341002 | 11/1989 |
| EP | 0556449 | 8/1993 |
| EP | 0406667 | 1/1995 |
| EP | 0710508 | 5/1996 |
| EP | 0953937 | 11/1999 |
| EP | 0978373 | 2/2000 |
| EP | 1239307 | 9/2002 |
| EP | 1353197 | 10/2003 |
| EP | 1 498 545 A | 1/2005 |
| EP | 1 719 636 | 11/2006 |
| GB | 1107395 | 3/1968 |
| GB | 1131038 | 10/1968 |
| JP | 63172779 | 7/1988 |
| WO | WO88/07214 | 9/1988 |
| WO | 95/13569 | 5/1995 |
| WO | 00/08596 | 2/2000 |
| WO | 01/03945 | 1/2001 |
| WO | WO 01/53113 A | 7/2001 |
| WO | 02/40599 | 5/2002 |
| WO | WO02/40600 | 5/2002 |
| WO | 02/53677 | 7/2002 |
| WO | WO02/090002 | 11/2002 |
| WO | WO03/011980 | 2/2003 |
| WO | 03/102084 | 12/2003 |
| WO | WO2004/007096 | 1/2004 |
| WO | 2004/024836 | 3/2004 |
| WO | 05/017048 | 2/2005 |

OTHER PUBLICATIONS

Dobrowolski et al., "Research on Thin Film Anticounterfeiting Coatings at the National Research Council of Canada", Applied Optics, vol. 28, No. 14, pp. 2702-2717 (Jul. 15, 1989).

Powell et al, (ED.), Vapor Deposition, John Wiley & Sons, p. 132 (1996).

Van Renesse (Ed.), Optical Document Security, 2nd Ed., Artech House, 254, 349-69 (1997).

Prokes et al (Ed.), Novel Methods of Nanoscale Wire Formation, Mat. Research Soc. Bul., pp. 13-14 (Aug. 1999).

Lotz et al., Optical Layers on Large Area Plastic Films, Precision, Applied Films (Nov. 2001).

Argoitia et al, "Pigments Exhibiting Diffractive Effects", Soc. of Vac. Coaters, 45th Annual Tech. Conf. Proceed. (2002).

Argoitia et al, "The concept of printable holograms through the alignment of diffractive pigments", SPIE Conference on Document Security, Jan. 2004.

Coombs et al, "Integration of contracting technologies into advanced optical security devices", SPIE Conference on Document Security, Jan. 2004.

Llewellyn, "Dovids: Functional Beauty—discussion about holography", Paper, Film, and Foil Converter, Aug. 2002.

Hardin, "Optical tricks designed to foil counterfeiters" OE Reports, No. 191, Nov. 1999.

Himpsel et al, "Nanowires by Step Decoration", Mat. Research Soc. Bul., p. 20-24 (Aug. 1999).

Halliday et al, "Fundamental of Physics, Sixth Edition", p. 662, Jul. 2000.
R. Domnick et al, "Influence of Nanosized Metal Clusters on the Generation of Strong Colors and Controlling of their Properties through Physical Vapor Deposition (PVD)" 49th Annual Technical Conference Proceedings (2006), Society of vacuum Coasters.
Argoitia, "Pigments Exhibiting A Combination of Thin Film and Diffractive Light Interference", AIMCAL Fall Technical Conf., 16th International Vacuum Web Coating Conf., Jan. 2002.

* cited by examiner

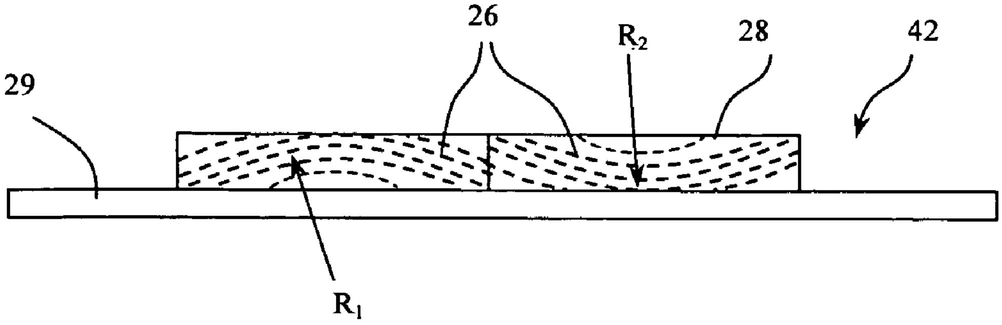
Fig. 2D (cross-section)
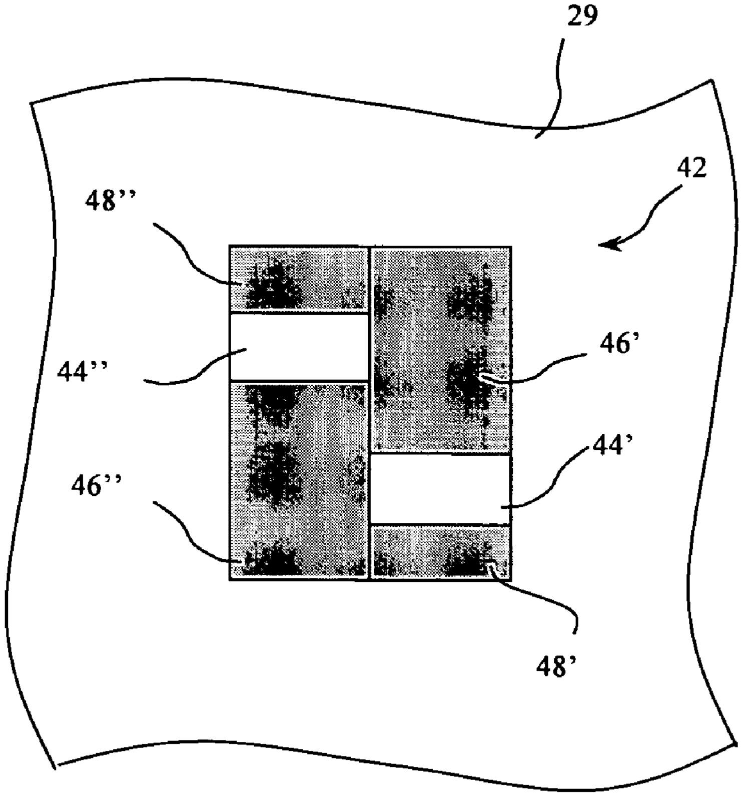
Fig. 2E (top view)

METHOD AND APPARATUS FOR ORIENTING MAGNETIC FLAKES

CROSS-REFERENCE TO RELATED APPLICATIONS

This patent application is a continuation-in-part of U.S. patent application Ser. No. 10/386,894, now U.S. Pat. No. 7,047,883, filed Mar. 11, 2003 which claims priority from U.S. Provisional Patent Application Ser. No. 60/410,546 filed Sep. 13, 2002 by Vladimir P. Raksha, from U.S. Provisional Patent Application Ser. No. 60/410,547 filed Sep. 13, 2002 by Vladimir P. Raksha, Paul G. Coombs, Charles T. Markantes, Dishuan Chu, and Jay M. Holman, and from U.S. Provisional Patent Application Ser. No. 60/396,210 filed Jul. 15, 2002 by Vladimir P. Raksha, Paul G. Coombs, Charles T. Markantes, Dishuan Chu, and Jay M. Holman, the disclosures of which are hereby incorporated in their entirety for all purposes.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

This invention relates generally to optically variable pigments, films, devices, and images, and more particularly to aligning or orienting magnetic flakes, such as during a painting or printing process, to obtain an illusive optical effect.

Optically variable devices are used in a wide variety of applications, both decorative and utilitarian. Optically variable devices can be made in variety of ways to achieve a variety of effects. Examples of optically variable devices include the holograms imprinted on credit cards and authentic software documentation, color-shifting images printed on banknotes, and enhancing the surface appearance of items such as motorcycle helmets and wheel covers.

Optically variable devices can be made as film or foil that is pressed, stamped, glued, or otherwise attached to an object, and can also be made using optically variable pigments. One type of optically variable pigment is commonly called a color-shifting pigment because the apparent color of images appropriately printed with such pigments changes as the angle of view and/or illumination is tilted. A common example is the “20” printed with color-shifting pigment in the lower right-hand corner of a U.S. twenty-dollar bill, which serves as an anti-counterfeiting device.

Some anti-counterfeiting devices are covert, while others are intended to be noticed. Unfortunately, some optically variable devices that are intended to be noticed are not widely known because the optically variable aspect of the device is not sufficiently dramatic. For example, the color shift of an image printed with color-shifting pigment might not be noticed under uniform fluorescent ceiling lights, but more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Optically variable devices can also be made with magnetic pigments that are aligned with a magnetic field after applying the pigment (typically in a carrier such as an ink vehicle or a paint vehicle) to a surface. However, painting with magnetic pigments has been used mostly for decorative purposes. For example, use of magnetic pigments has been described to produce painted cover wheels having a decorative feature that appears as a three-dimensional shape. A pattern was formed on the painted product by applying a magnetic field to the product while the paint medium still was in a liquid state. The paint medium had dispersed magnetic non-spherical particles that aligned along the magnetic field lines. The field had two regions. The first region contained lines of a magnetic force that were oriented parallel to the surface and arranged in a shape of a desired pattern. The second region contained lines that were non-parallel to the surface of the painted product and arranged around the pattern. To form the pattern, permanent magnets or electromagnets with the shape corresponding to the shape of desired pattern were located underneath the painted product to orient in the magnetic field non-spherical magnetic particles dispersed in the paint while the paint was still wet. When the paint dried, the pattern was visible on the surface of the painted product as the light rays incident on the paint layer were influenced differently by the oriented magnetic particles.

Similarly, a process for producing of a pattern of flaked magnetic particles in fluoropolymer matrix has been described. After coating a product with a composition in liquid form, a magnet with desirable shape was placed on the underside of the substrate. Magnetic flakes dispersed in a liquid organic medium orient themselves parallel to the magnetic field lines, tilting from the original planar orientation. This tilt varied from perpendicular to the surface of a substrate to the original orientation, which included flakes essentially parallel to the surface of the product. The planar oriented flakes reflected incident light back to the viewer, while the reoriented flakes did not, providing the appearance of a three dimensional pattern in the coating.

While these approaches describe methods and apparatus for formation of three-dimensional-like images in paint layers, they are not suitable for high-speed printing processes because they are essentially batch processes. It is desirable to provide methods and apparatus for a high-speed in-line printing and painting that re-orients magnetic pigment flakes. It is further desirable to create more noticeable optically variable security features on financial documents and other products.

SUMMARY OF THE INVENTION

The present invention provides articles, methods and apparatus related to images having an illusive optical effect. The images may be printed in a high-speed, continuous printing operation, or in a batch printing operation.

In one embodiment of the present invention, an image is printed on a substrate. The image has a first image portion having a first plurality of magnetic flakes aligned so as to reflect light in a first direction and a second image portion adjacent to the first image portion having a second plurality of magnetic flakes aligned so as to reflect light in a second direction, the first image portion appearing lighter than the second image portion when viewed from a first viewing direction and the first image portion appearing darker than the second image portion when viewed from a second viewing direction.

In another embodiment, an image printed on a substrate has a plurality of magnetic flakes wherein a portion of the plurality of magnetic flakes are aligned in an arching pattern relative to a surface of the substrate so as to create a contrasting bar across the image appearing between a first adjacent field and a second adjacent field, the contrasting bar appearing to move as the image is tilted relative to a viewing angle.

In another embodiment, an apparatus for orienting magnetic pigment in a fluid carrier printed on a first side of a substrate in a linear printing process includes a magnet disposed proximate to a second side of the substrate. The magnet creates a selected magnetic field configuration to orient the magnetic pigment to form an image.

In another embodiment, an apparatus for printing an illusive image called a rolling bar has a magnet having a north face, a south face, and an upper edge, the upper edge extending along a direction of travel of the substrate, a magnetic axis between the north face and the south face being transverse to the direction of travel of the substrate, and a trailing edge having a chamfered upper corner.

In another embodiment, a method of forming an image on a substrate includes steps of printing a field of magnetic pigment dispersed in a fluid carrier on a substrate, moving the substrate relative to a magnet to selectively orient the magnetic pigment to form the image, and fixing the image.

BRIEF DESCRIPTION OF THE DRAWINGS

FIG. 2D is a simplified cross section of a printed image that will be referred to as a "double rolling bar" for purposes of discussion, according to another embodiment of the present invention FIG. 2E is a top view of the image shown in FIG. 2D.

DETAILED DESCRIPTION OF THE INVENTION

I. Introduction

The present invention in its various embodiments solves the problem of predetermined orientation of magnetic flakes of optically variable ink in a high-speed printing process. Normally, particles of an optically variable pigment dispersed in a liquid paint or ink vehicle generally orient themselves parallel to the surface when printed or painted on to a surface. Orientation parallel to the surface provides high reflectance of incident light from the coated surface. Magnetic flakes can be tilted while in the liquid medium by applying a magnetic field. The flakes generally align in such way that the longest diagonal of a flake follows a magnetic field line. Depending on the position and strength of the magnet, the magnetic field lines can penetrate the substrate at different angles, tilting magnetic flakes to these angles. A tilted flake reflects incident light differently than a flake parallel to the surface of the printed substrate. Reflectance is and a hue can both be different. Tilted flakes typically look darker and have a different color than flakes parallel to the surface at a normal viewing angle.

Orienting magnetic flakes in printed images poses several problems. Many modern printing processes are high-speed relative to the batch-type process that apply a magnet against a static (non-moving) coated article and hold the magnet in position while the paint or ink dries. In some printing presses, the paper substrate is moving at speeds of 100-160 meters per minute. Sheets of paper are stacked after one printing operation, and fed to another. The inks used in such operations typically dry within milliseconds. Convention processes are not suitable for such applications.

It was discovered that one way to obtain enhanced optical effects in the painted/printed image, is by orienting magnetic flakes perpendicular to the direction of the moving substrate. In other words, the painted or printed liquid paint or ink medium with dispersed flakes on the substrate moves perpendicular to magnetic lines of the field to cause re-orientation of the flakes. This type of orientation can provide remarkable illusive optical effects in the printed image. One type of optical effect will be referred to as a kinematic optical effect for purposes of discussion. An illusive kinematic optical effect generally provides an illusion of motion in the printed image as the image is tilted relative to the viewing angle, assuming a stationary illumination source. Another illusive optical effect provides virtual depth to a printed, two-dimensional image. Some images may provide both motion and virtual depth. Another type of illusive optical effect switched the appearance of a printed field, such as by alternating between bright and dark colors as the image is tilted back and forth.

II. Examples of Printed Illusive Images

Figure 1A:
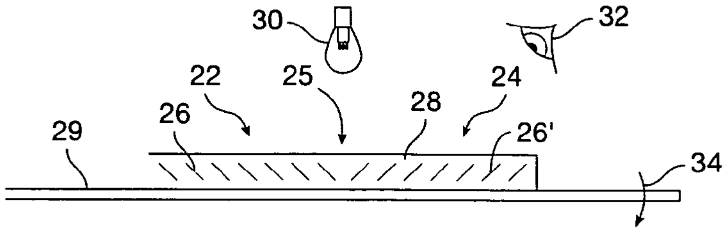
FIG. 1A is a simplified cross section of a printed image that will be referred to as a "flip-flop"

FIG. 1A is a simplified cross section of a printed image 20 that will be referred to as a "switching" optical effect, or "flip-flop", for purposes of discussion, according to an embodiment of the present invention. The flip-flop includes a first printed portion 22 and a second printed portion 24, separated by a transition 25. Pigment flakes 26 surrounded by carrier 28, such as an ink vehicle or a paint vehicle have been aligned parallel to a first plane in the first portion, and pigment flakes 26' in the second portion have been aligned parallel to a second plane. The flakes are shown as short lines in the cross-sectional view. The flakes are magnetic flakes, i.e. pigment flakes that can be aligned using a magnetic field. They might or might not retain remnant magnetization. Not all flakes in each portion are precisely parallel to each other or the respective plane of alignment, but the overall effect is essentially as illustrated. The figures are not drawn to scale. A typical flake might be twenty microns across and about one micron thick, hence the figures are merely illustrative. The image is printed or painted on a substrate 29, such as paper, plastic film, laminate, card stock, or other surface. For convenience of discussion, the term "printed" will be used to generally describe the application of pigments in a carrier to a surface, which may include other techniques, including techniques others might refer to as "painting".

Generally, flakes viewed normal to the plane of the flake appear bright, while flakes viewed along the edge of the plane appear dark. For example, light from an illumination source 30 is reflected off the flakes in the first region to the viewer 32. If the image is tilted in the direction indicated by the arrow 34, the flakes in the first region 22 will be viewed on-end, while light will be reflected off the flakes in the second region 24. Thus, in the first viewing position the first region will appear light and the second region will appear dark, while in the second viewing position the fields will flip-flop, the first region becoming dark and the second region becoming light. This provides a very striking visual effect. Similarly, if the pigment flakes are color-shifting, one portion may appear to be a first color and the other portion another color.

The carrier is typically transparent, either clear or tinted, and the flakes are typically fairly reflective. For example, the carrier could be tinted green and the flakes could include a metallic layer, such as a thin film of aluminum, gold, nickel, platinum, or metal alloy, or be a metal flake, such as a nickel or alloy flake. The light reflected off a metal layer through the green-tinted carrier might appear bright green, while another portion with flakes viewed on end might appear dark green or other color. If the flakes are merely metallic flakes in a clear carrier, then one portion of the image might appear bright metallic, while another appears dark. Alternatively, the metallic flakes might be coated with a tinted layer, or the flakes might include an optical interference structure, such as an absorber-spacer-reflector Fabry-Perot type structure. Furthermore, a diffractive structure may be formed on the reflective surface for providing an enhancement and an additional security feature. The diffractive structure may have a simple linear grating formed in the reflective surface, or may have a more complex predetermined pattern that can only be discerned when magnified but having an overall effect when viewing. By providing diffractive reflective layer, a colour change or brightness change is seen by a viewer by simply turning the sheet, banknote, or structure having the diffractive flakes.

The process of fabricating diffractive flakes is described in detail in U.S. Pat. No. 6,692,830. U.S. patent application 20030190473, describes fabricating chromatic diffractive flakes. Producing a magnetic diffractive flake is similar to producing a diffractive flake, however one of the layers is required to be magnetic. In fact, the magnetic layer can be disguised by way of being sandwiched between Al layers; in this manner the magnetic layer and then it doesn't substantially affect the optical design of the flake; or could simultaneously play an optically active role as absorber, dielectric or reflector in a thin film interference optical design.

Figure 1B:
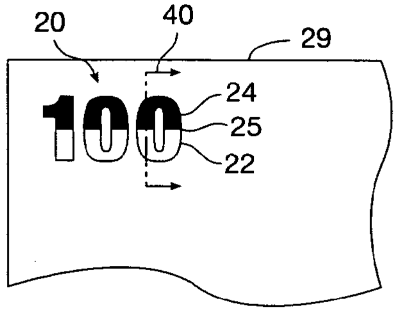
FIG. 1B is a simplified plan view of the printed image on a document at a first selected viewing angle.

FIG. 1B is a simplified plan view of the printed image 20 on the substrate 29, which could be a document, such as a bank note or stock certificate, at a first selected viewing angle. The printed image can act as a security and/or authentication feature because the illusive image will not photocopy and cannot be produced using conventional printing techniques. The first portion 22 appears bright and the second portion 24 appears dark. The section line 40 indicates the cross section shown in FIG. 1A. The transition 25 between the first and second portions is relatively sharp. The document could be a bank note, stock certificate, or other high-value printed material, for example.

Figure 1C:
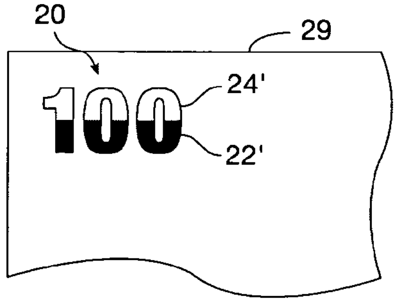
FIG. 1C is a simplified plan view of the printed image at a second selected viewing angle, obtained by tilting the image relative to the point of view.

FIG. 1C is a simplified plan view of the printed image 20 on the substrate 29 at a second selected viewing angle, obtained by tilting the image relative to the point of view. The first portion 22 now appears dark, while the second portion 24 appears light. The tilt angle at which the image flip-flops depends on the angle between the alignment planes of the flakes in the different portions of the image. In one sample, the image flipped from light to dark when tilted through about 15 degrees.

Figure 2A:
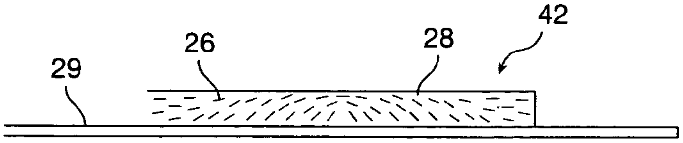
FIG. 2A is a simplified cross section of a printed image that will be referred to as a "rolling bar" for purposes of discussion, according to another embodiment of the present invention.

FIG. 2A is a simplified cross section of a printed image 42 of a kinematic optical device that will be referred to as a "rolling bar" for purposes of discussion, according to another embodiment of the present invention. The image includes pigment flakes 26 surrounded by a transparent carrier 28 printed on a substrate 29. The pigment flakes are aligned in a curving fashion. As with the flip-flop, the region(s) of the rolling bar that reflect light off the faces of the pigment flakes to the viewer appear lighter than areas that do not directly reflect the light to the viewer. This image provides a light band(s) or bar(s) that appear to move ("roll") across the image when the image is tilted with respect to the viewing angle (assuming a fixed illumination source(s).

Figure 2B:
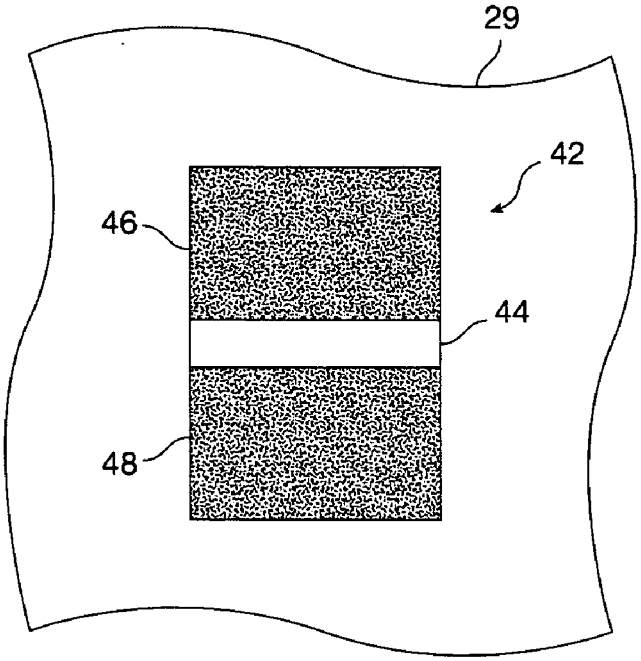
FIG. 2B is a simplified plan view of the rolling bar image at a first selected viewing angle.
Figure 2C:
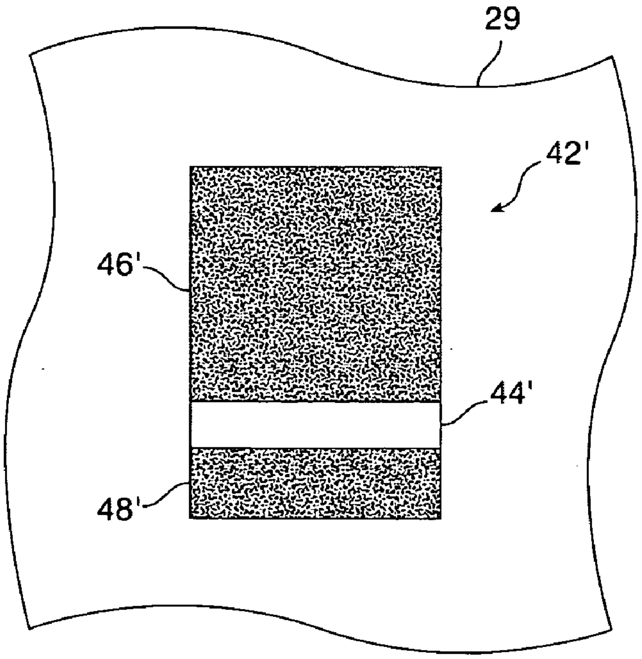
FIG. 2C is a simplified plan view of the rolling bar image at a second selected viewing angle.

FIG. 2B is a simplified plan view of the rolling bar image 42 at a first selected viewing angle. A bright bar 44 appears in a first position in the image between two contrasting fields 46, 48. FIG. 2C is a simplified plan view of the rolling bar image at a second selected viewing angle. The bright bar 44' appears to have "moved" to a second position in the image, and the sizes of the contrasting fields 46', 48' have changed. The alignment of the pigment flakes creates the illusion of a bar "rolling" down the image as the image is tilted (at a fixed viewing angle and fixed illumination). Tilting the image in the other direction makes the bar appear to roll in the opposite direction (up).

The bar may also appear to have depth, even though it is printed in a plane. The virtual depth can appear to be much greater than the physical thickness of the printed image. The tilting of the flakes in a selected pattern reflects light to provide the illusion of depth or "3D", as it is commonly referred to. A three-dimensional effect can be obtained by placing a shaped magnet behind the paper or other substrate with magnetic pigment flakes printed on the substrate in a fluid carrier. The flakes align along magnetic field lines and create the 3D image after setting (e.g. drying or curing) the carrier. The image often appears to move as it is tilted, hence kinematic 3D images may be formed.

Flip-flops and rolling bars can be printed with magnetic pigment flakes, i.e. pigment flakes that can be aligned using a magnetic field. A printed flip-flop type image provides an optically variable device with two distinct fields that can be obtained with a single print step and using a single ink formulation. A rolling bar type image provides an optically variable device that has a contrasting band that appears to move as the image is tilted, similar to the semi-precious stone known as Tiger's Eye. These printed images are quite noticeable and the illusive aspects would not photocopy. Such images may be applied to bank notes, stock certificates, software documentation, security seals, and similar objects as authentication and/or anti-counterfeiting devices. They are particularly desirable for high-volume printed documents, such as bank notes, packaging, and labels, because they can be printed in a high-speed printing operation, as is described below in Section III.

In another embodiment, shown in FIGS. 2D and 2E a "double rolling bar" is an image wherein one portion 44' has magnetic flakes oriented in convex fashion while another portion 44" of the image has magnetic flakes oriented in a concave orientation. To achieve this convex orientation, the "rolling bar" magnet is placed underneath the paper substrate. For the concave orientation, the magnet is placed above the paper substrate. A "Double tilt" image is formed when magnetic flakes in two regions of the image have differing and opposing orientation, for example, +30 degrees and −30 degrees. At one tilted position of the printed image one part of the image is dark and another part is light. When printed image is tilted in an opposing direction, the areas switch their light and dark regions so that the first image becomes light and the second image becomes dark. Depending upon the intended design, this switch of the light and dark may occur from the top to the bottom and back, as well as from the left to the right and back, in dependence upon the on orientation of the flakes. In FIGS. 2D and 2E the bright bar 44' appears to have "moved" to a second position in the image, and the sizes of the contrasting fields 46', 48' have changed; furthermore the bright bar 44" appears to have "moved" to a different position in the image, and the sizes of the contrasting fields 46", 48" have changed.

III. Exemplary Fabrication Apparatus

Figure 3A:
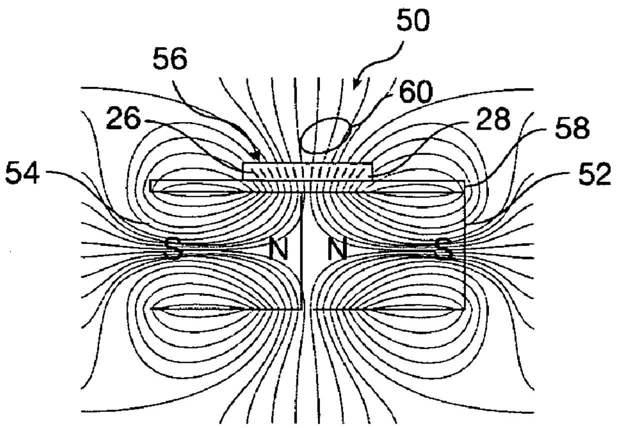
FIG. 3A is a simplified cross view of apparatus for producing a flip-flop type image.

FIG. 3A is a simplified cross view of a portion of an apparatus 50 for producing a flip-flop type image. The flakes 26 are arranged in a V-shaped manner where both branches of the V represent directions of the tilt and the apex represents a transition point. Such orientation of the flakes is possible when two magnetic fields oppose each other. Two magnets 52, 54 are aligned with opposing poles (in this case north-north). For the modeling purposes, the magnets were assumed to be 2"W by 1.5"H NdFeB magnets 40 MOe spaced 0.125 inches between the north poles. The type of magnet (material and strength) is selected according to the material of the flake, viscosity of the paint vehicle, and a substrate translation speed. In many cases, neodymium-boron-iron, samarium-cobalt, and/or ALNICO magnet can be utilized. The optimum distance between magnets is important for the formation of the uniformity of the optical effect for a particular printed image size.

The image 56 is printed on a thin printing or painting substrate 58, such as a sheet of paper, plastic, film, or card stock in a previous printing step, which is not illustrated in this figure. In a typical operation, several images are printed on the substrate, which is subsequently cut into individual documents, such as printing a sheet of banknotes that is cut into currency. The carrier 28 is still wet or at least sufficiently fluid to allow alignment of the magnetic flakes with the magnets. The carrier typically sets shortly after alignment to allow handling of the printed substrate without smearing the image. The magnetic flakes 26 follow direction of magnetic lines 60 and tilt.

Figure 3B:
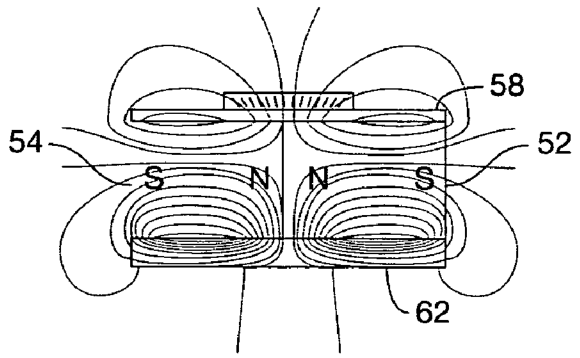
FIG. 3B is a simplified cross-section of apparatus for producing a flip-flop type image.

FIG. 3B is a simplified cross-section of a portion of an apparatus for producing a flip-flop type image where the magnets 52, 54 are mounted on a base 62 made from a metal alloy with high magnetic permeability, such as SUPERMALLOY. It is easier to make an assembly of several magnets if they are attached to a base, and the base provides a path for the magnetic field on the opposite side of the magnet, and alters the magnetic field lines on the print side of the assembly. The magnetic base acts as a shunt for the magnetic field and reduces the magnetic field behind ("underneath") the assembly, thus screening objects near the backside from high magnetic fields and forces. The magnetic base also holds the magnets securely in position without screws, bolts, welds, or the like. Magnetic field circulates inside the base 62 providing uniformity of the field between the magnets. The field is the most intensive in the gap between magnets and above it.

Figure 3C:
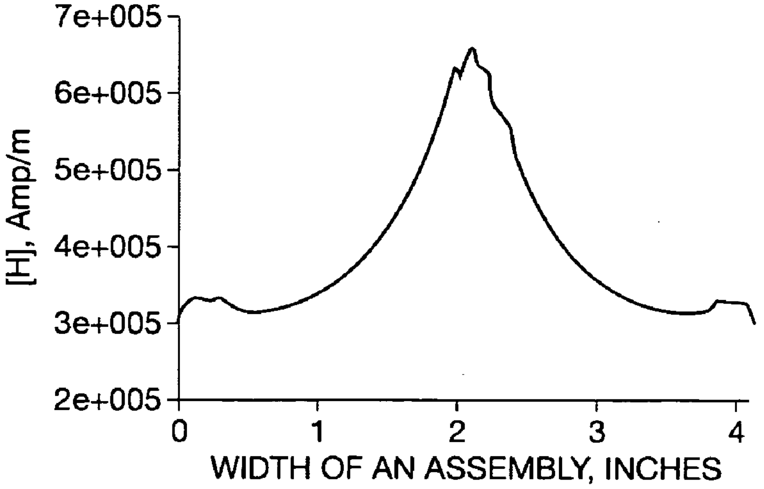
FIG. 3C illustrates the calculated magnitude of the field intensity across the apparatus of FIG. 3B

FIG. 3C illustrates the calculated magnitude of the field intensity across the apparatus of FIG. 3B. Intensity is low near the edges of magnets, and becomes very high in the middle, providing a sharp transition between the flakes in adjacent portions of the image.

Figure 4:
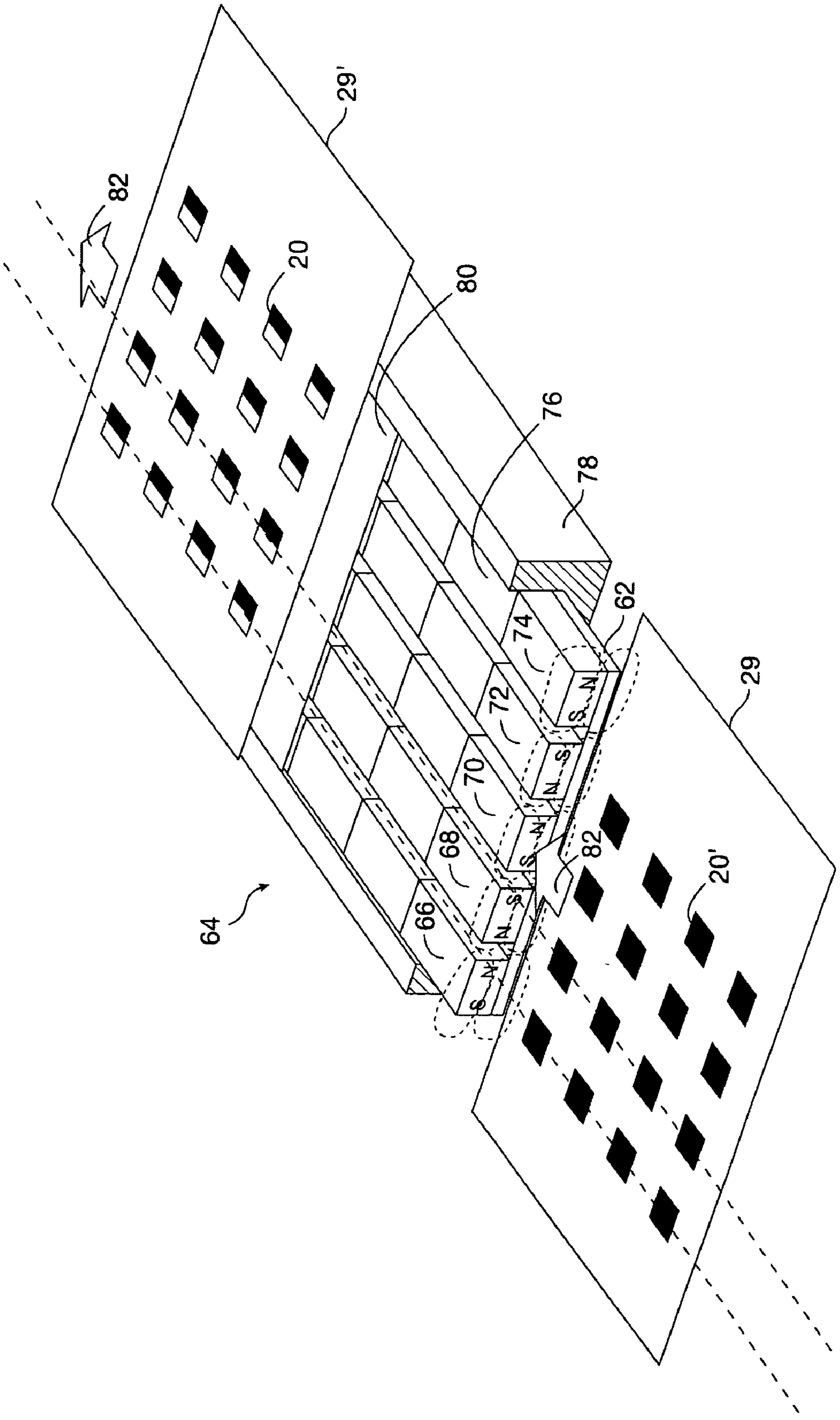
FIG. 4 is a simplified schematic of a magnetic assembly that can be installed in the in-line printing or painting equipment.

FIG. 4 is a simplified schematic of a magnetic assembly 64 that can be installed in the in-line printing or painting equipment. Permanent magnets 66, 68, 70, 72, 74, 76 with their north and south poles indicated with "N" and "S", respectively, similar to those illustrated in FIG. 3B, are attached to the base 62 by magnetic attraction. The magnets may be magnetic bars, or may be segmented. That is, rows of magnets, e.g. 74, 76, etc., may be used. Plastic spacers (not shown in the picture) may be inserted between magnets to prevent their collision and provide safety. The assembly is enclosed in a case 78 with a cover 80. The case and cover may be aluminum or other non-magnetic material, for example.

A plastic or paper substrate 29 with printed fields 20' (e.g. squares or other shapes) moves at high speed over the top of the assembly in the direction of the arrows 82 in such way that the intersections of magnetic field lines goes through the printed fields. It is possible to align the substrate to the magnetic assembly so that the intersections of magnetic field lines pass through the centers of the fields. Alternatively, the centers between the magnets may be offset from the centers of the printed fields. Similarly, the substrate could be a continuous roll, rather than sequential sheets. In many cases, several sets of images are printed on a sheet, and the sheet is cut into individual documents, such as bank notes, after the printing is completed.

After tilting of the flakes, the image 20 has an illusive optical effect. A drier for water- or solvent-based paints or inks (not shown in the picture) or UV-light source for photopolymers typically follows the magnetic assembly shortly in the line to dry the ink or paint vehicle and fix re-oriented flakes in their aligned positions. It is generally desirable to avoid magnetizing flakes before application, as they may clump together. Pigment flakes with layers of nickel or PERMALLOY about 100-150 nm thick have been found to be suitable.

Figure 5A:
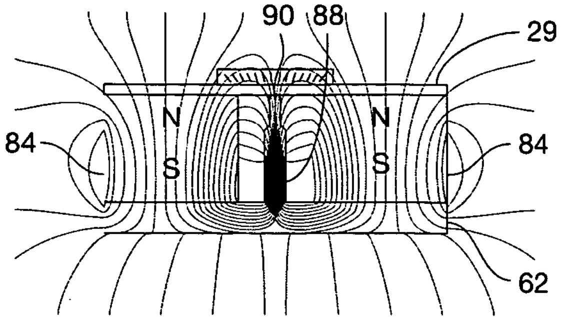
FIG. 5A is a simplified cross section of apparatus for producing a flip-flop type image with a sharper transition, according to an embodiment of the present invention.

FIG. 5A is a simplified cross section of an apparatus for producing a flip-flop type image with a sharper transition, according to an embodiment of the present invention. Two NdFeB magnets 84 (modeled as being 2"W by 1.5"H each) are placed on the magnetic base 62 facing with their north poles "up". The distance between magnets is about one inch. A blade 88 made of a high-permeability metal or metal alloy, such as SUPERMALLOY, is attached to the base between the magnets. The point of attack of the tip 90 of the blade is in the range of about 5 degrees to about 150 degrees. The blade re-shapes the magnetic field lines, pulling them closer and making the tip as a point where the magnetic field lines originate.

Figure 5B:
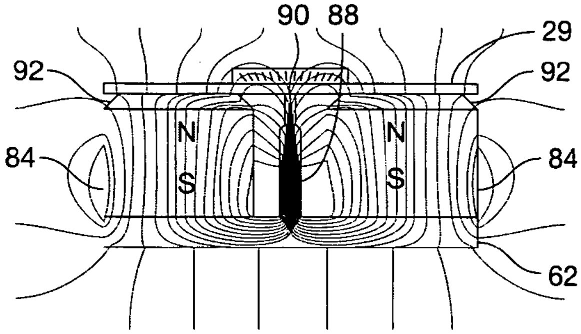
FIG. 5B is a simplified cross section of apparatus for producing an image according to another embodiment of the present invention.

FIG. 5B is a simplified cross section of an apparatus for producing an image according to another embodiment of the present invention. Shaped SUPERMALLOY caps 92 are placed on the top of magnets 84 to bend the magnetic field lines, as illustrated. The caps bend the field, bringing it closer to the tip, which makes the V-shape transition of the lines even sharper.

Figure 5C:
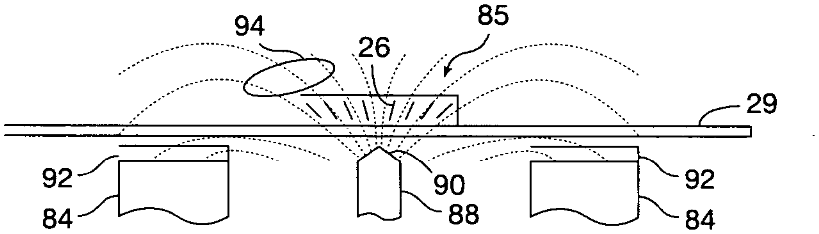
FIG. 5C is a simplified cross section of a portion of the apparatus illustrated in FIG. 5B, showing the orientation of the flakes in such a magnetic device.

FIG. 5C is a simplified cross section of a portion of the apparatus illustrated in FIG. 5B, showing the orientation of the flakes in such a magnetic device. The substrate 29 is placed on the top of the device sliding along the caps 92 (or magnets, in the case of FIG. 5A) in the direction from the viewer into the page. The printed image 85 is located above the tip. The flakes 26 follow magnetic lines 94 and tilt accordingly. This view more clearly shows the pointed nature of the tip of the blade, which produces a sharp transition between the two areas of the illusive image.

Figure 5D:
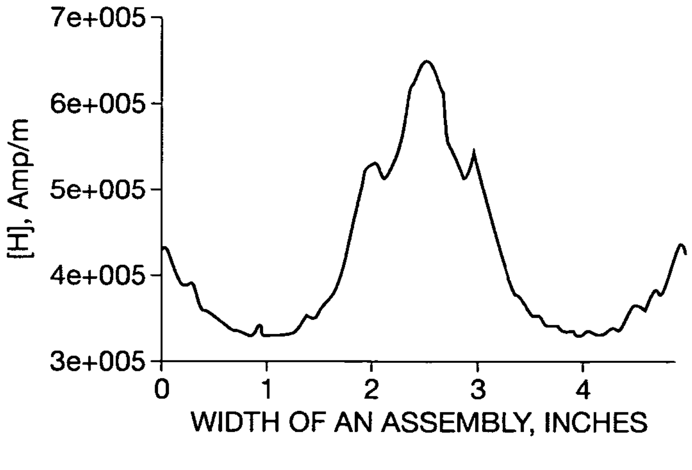
FIG. 5D is a graph illustrating the calculated magnitude of field intensity for the apparatus of FIGS. 5B and 5C.

FIG. 5D is a graph illustrating the calculated magnitude of field intensity for the apparatus of FIGS. 5B and 5C. The field intensity is narrower compared with the field intensity plot of FIG. 3C, and produces a sharper transition.

Figure 6:
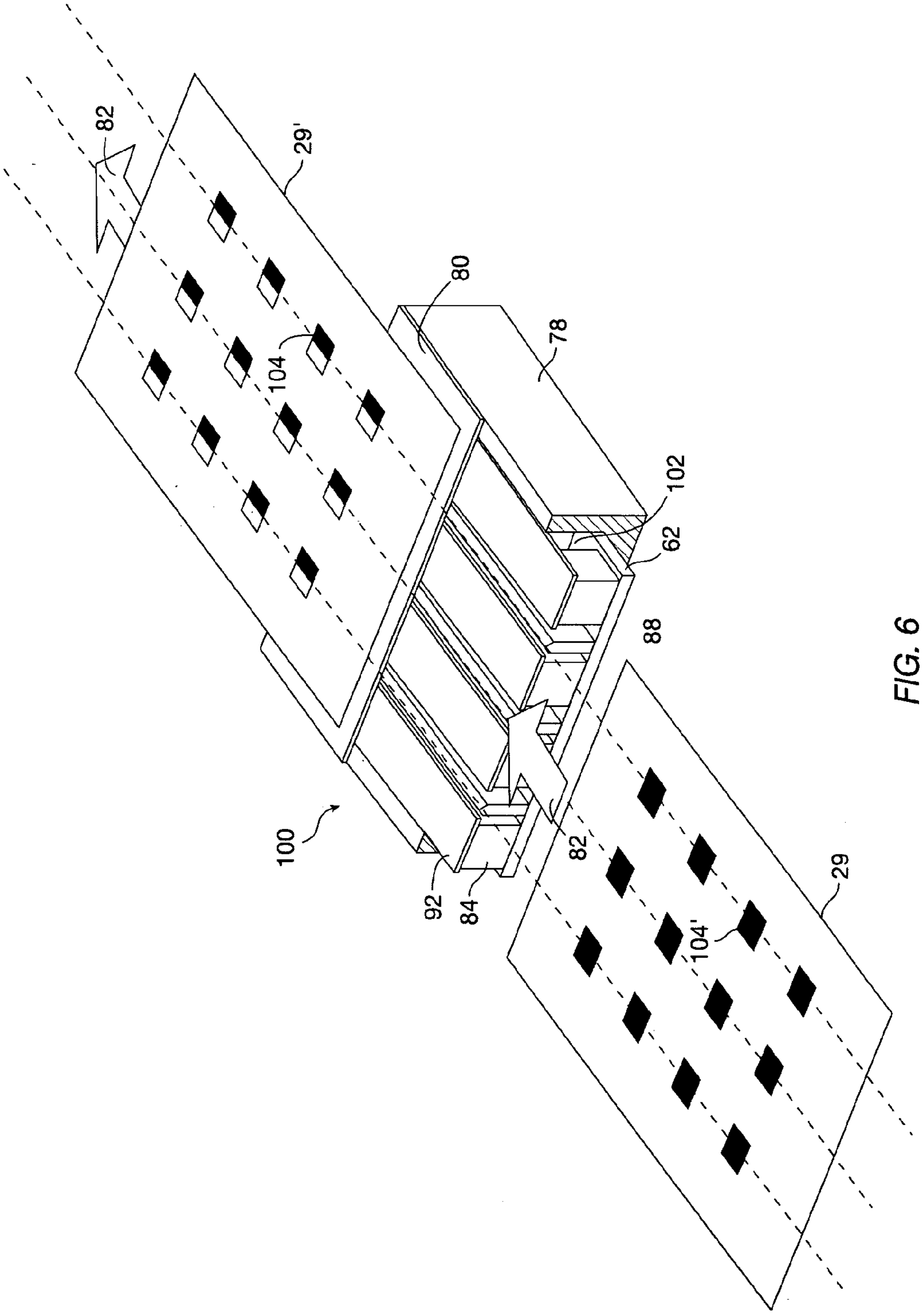
FIG. 6 is a simplified schematic of a magnetic assembly that can be installed in the in-line printing or painting equipment.

FIG. 6 is a simplified schematic of a magnetic assembly 100 that can be installed in the in-line printing or painting equipment. Permanent magnets 84 with their north and south poles as illustrated in FIGS. 5A and 5B are mounted on a magnetic base 62. Alternatively, the south poles could be facing up. Cap plates 92 are magnetically attached to the top of magnets. Blades 88 are mounted on the base with their edges extending along the direction of translation 82 of the substrates 29, 29'. The in-line magnets 84 can be installed either next to each other or with a gap 102 between them. The magnetic assembly is typically enclosed in a case 78 with a cover plate 80.

Fields 104' printed on the substrate 29 have generally non-oriented flakes. Some alignment of the flakes may occur as an artifact of the printing process, and generally some of the flakes tending to align in the plane of the substrate. When the substrate moves at high speed in the direction indicated by the arrow 82 above the magnetic assembly, the flakes change their orientation along lines of the magnetic field forming an illusive image 104 (flip-flop). The image has two areas with reflect light in different directions and a relatively sharp border (transition) between them.

Figure 7A:
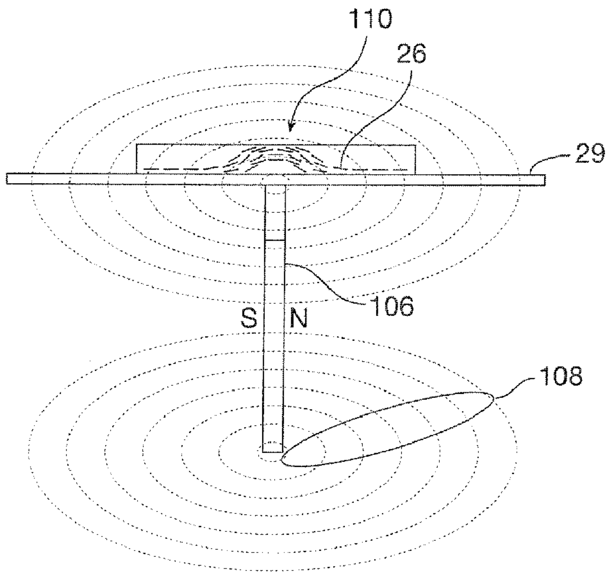
FIG. 7A is a simplified cross section of another embodiment of the invention for forming a semi-circular orientation of flakes in paint or ink for a rolling bar type image.

FIG. 7A is a simplified cross section of another embodiment of the invention for forming a semi-circular orientation of flakes in paint or ink for a rolling bar type image. A thin permanent magnet 106 is magnetized through its thin section, as illustrated. The magnet has circular magnetic lines 108 on its ends. The substrate 29 with the printed magnetic flakes dispersed in a fluid carrier moves along the magnet from the viewer into the paper. The flakes 26 tilt along direction of the magnetic lines 108 and form a semi-circle pattern above the magnet.

Figure 7B:
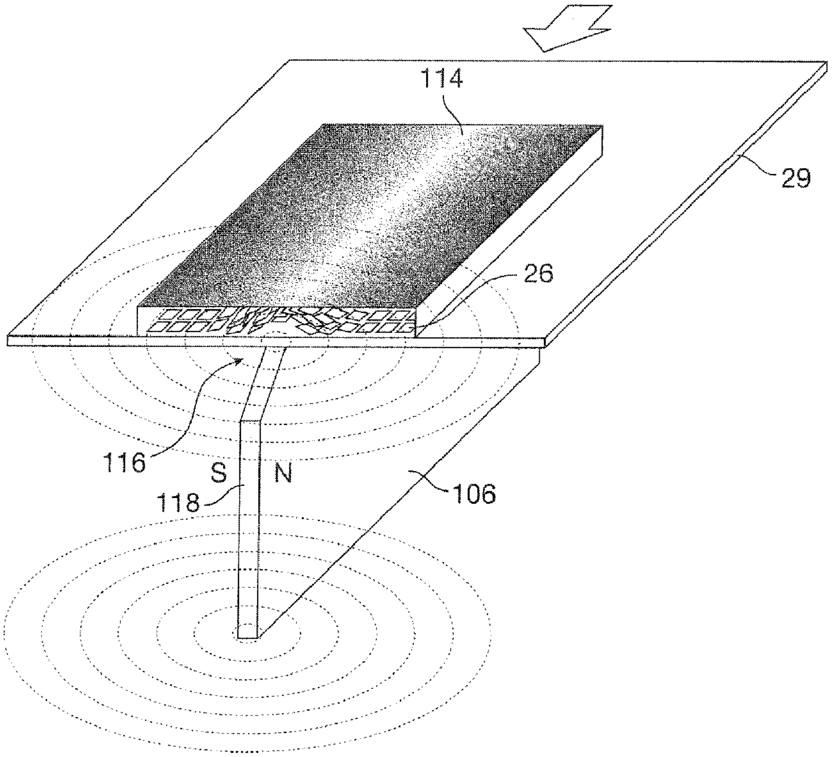
FIG. 7B is a simplified perspective view of apparatus in accordance with FIG. 7A.

FIG. 7B is a simplified perspective view of an apparatus in accordance with FIG. 7A. The substrate 29 moves across the magnet 106 in the direction of the arrow. The image 110 forms a rolling bar feature 114, which will appear to move up and down as the image is tilted or the viewing angle is changed. The flakes 26 are shown as being tilted in relation to the magnetic field lines. The image is typically very thin, and the flakes might not form a hump, as illustrated, but generally align along the magnetic field lines to provide the desired arched reflective properties to create a rolling bar effect. The bar appeared to roll up and down the image when tilted through an angle of about 25 degrees in one example.

It was found that the intensity of the rolling bar effect could be enhanced by chamfering 116 the trailing edge 118 of the magnet. It is believed that this gradually reduces the magnetic field as the image clears the magnet. Otherwise, the magnetic transition occurring at a sharp corner of the magnet might re-arrange the orientation of the flakes and degrade the visual effect of the rolling bar. In a particular embodiment, the corner of the magnet was chamfered at an angle of thirty degrees from the plane of the substrate. An alternative approach is to fix the flakes before they pass over the trailing edge of the magnet. This could be done by providing a UV source part way down the run of the magnet, for UV-curing carrier, or a drying source for evaporative carriers, for example.

Figure 7C:
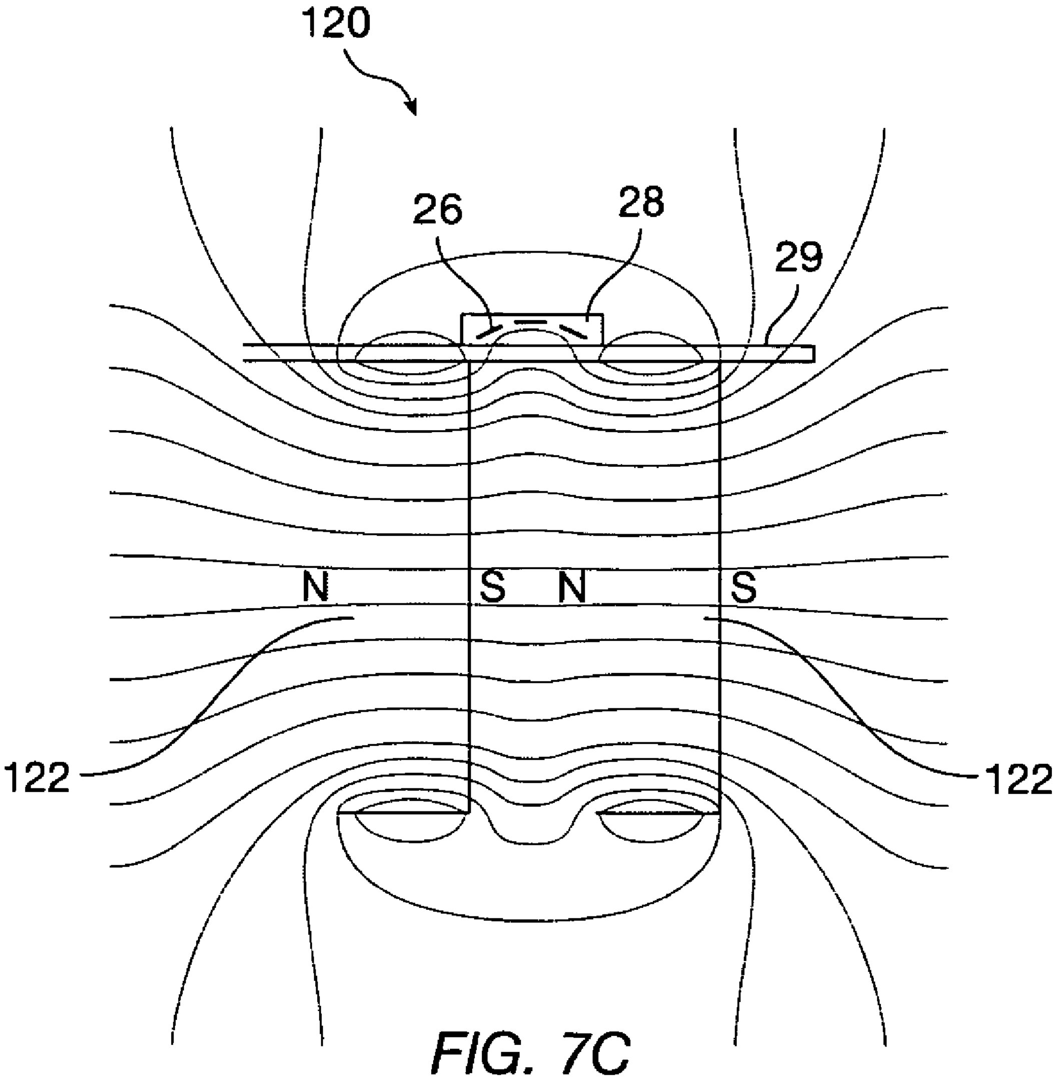
FIG. 7C is a simplified side view of apparatus for forming a rolling bar image in accordance with another embodiment of the present invention.

FIG. 7C is a simplified side view of another apparatus 120 for forming a rolling bar image according to another embodiment of the present invention. The rolling bar effect is obtained using two magnets 122. The magnetic pigment flakes 26 orient themselves in the liquid carrier 28 along the oval magnetic field lines.

Figure 8:
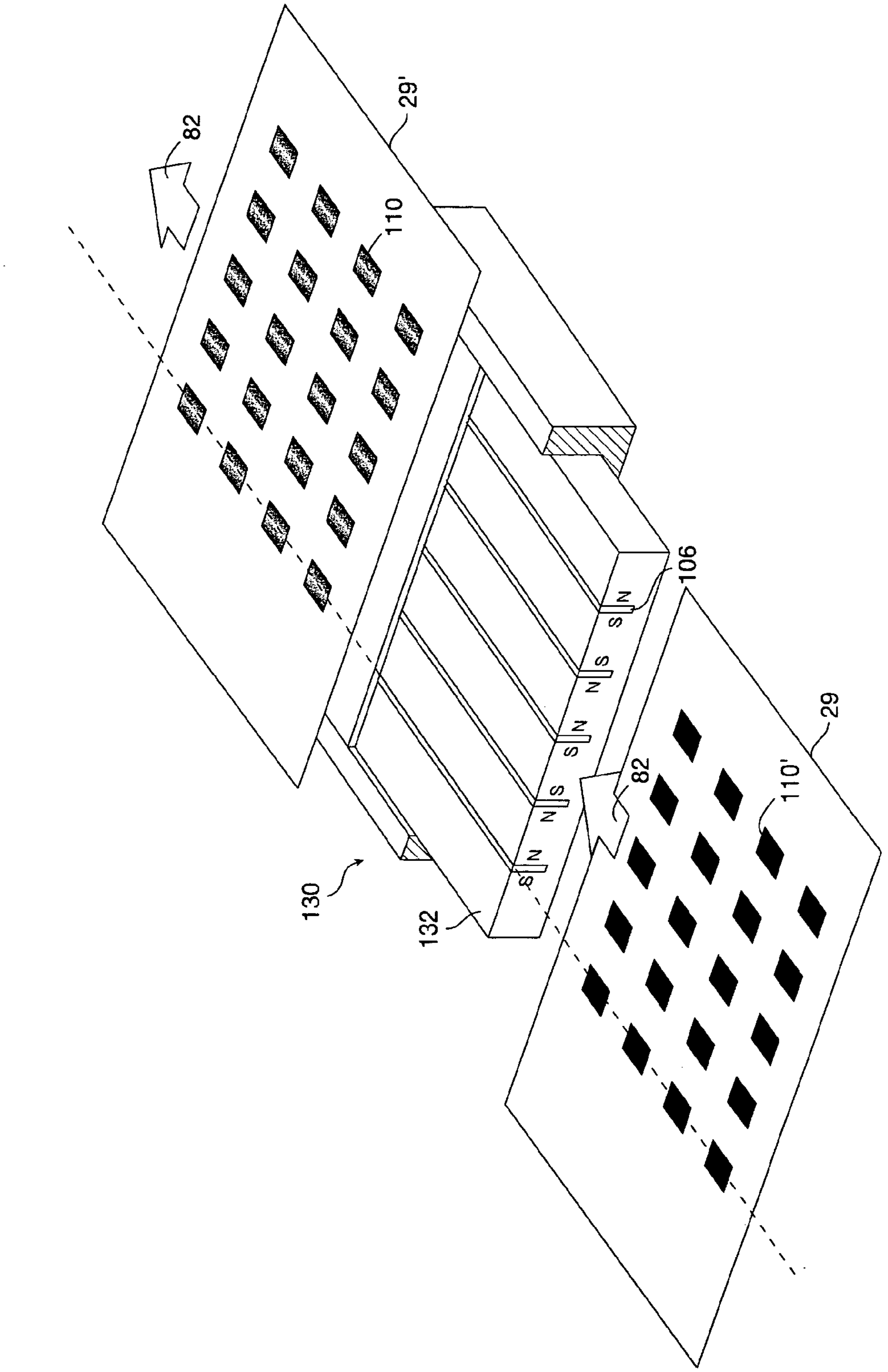
FIG. 8 is a simplified schematic of an apparatus for printing rolling bar images according to an embodiment of the present invention that can be installed in the in-line printing or painting equipment

FIG. 8 is a simplified schematic of an apparatus 130 for printing rolling bar images according to an embodiment of the present invention that can be installed in the in-line printing or painting equipment. Thin vertical magnets 106, with their north-south polarization as shown, are installed in a plastic housing 132 that separates the magnets at selected distances, generally according to the location of the printed fields 110' on the substrate 29. The magnets are aligned in such fashion that they oppose each other. In other words, the north pole of one row of magnets faces the north pole of an adjacent row, while the south pole faces the south pole of an adjacent row of magnets from the other side.

In comparison to the magnetic devices shown in FIGS. 4 and 6, which have a base fabricated of highly permeable alloy for the mounting of the magnets and concentrating of a field strength just above the middle of the gap or above the tip of the blade, the apparatus FIG. 8 does not have a metallic base. A base made from a metal having high magnetic permeability would reduce the strength of a magnetic field on the side of the magnet that is responsible for the tilt of the flakes. Instead of the base, the magnets are inserted in slits of the plastic housing in such way that the upper part of the magnets goes underneath of the center of printed fields, but could be offset from the center. The substrate 29, 29' move at high speed atop the magnets in the direction of the arrows 82. Passing above the magnets, the flakes in the printed images orient themselves along lines of the magnetic field, creating an illusive optical effect in rolling bar image 110.

Figure 9A:
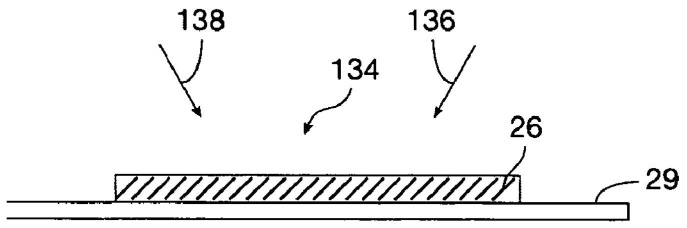
FIG. 9A is a simplified cross section of another optical effect that is possible to achieve using magnetic alignment techniques in high-speed printing processes.

FIG. 9A is a simplified cross section of another optical effect that is possible to achieve using magnetic alignment techniques in high-speed printing processes. The pigment flakes 26 in the image 134 are generally aligned parallel to each other, but not parallel to the surface of the substrate 29. Again, it is not necessary that each flake be perfectly aligned with each other flake, but the visual impression obtained is essentially in accordance with the illustration. Alignment of the majority of the flakes in the manner illustrated causes an interesting optical effect. The image looks dark when observed from one direction 136 and bright when observed from another direction 138.

Figure 9B:
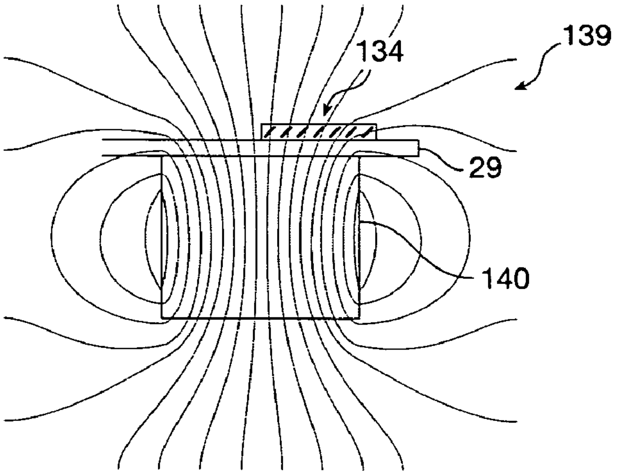
FIG. 9B is a simplified cross section of apparatus according to an embodiment of the present invention capable of producing the image illustrated in FIG. 9A.

FIG. 9B is a simplified cross section of a apparatus 139 according to an embodiment of the present invention capable of producing the image illustrated in FIG. 9A. A printed field 134 with still-wet paint or ink is placed above permanent magnet 140 with offset position relatively the magnet axes. The analysis of the magnetic field was modeled assuming a 2" by 1.5" NdFeB 40 MOe magnet. The magnitude of the field intensity is lower in the center of the magnet and higher towards its edges.

In general, electromagnets might be used in some embodiments, but it is difficult to obtain magnetic fields as high as can be obtained with current supermagnets in the confined spaces of a high-speed printing machine. The coils of electromagnetic also tend to generate heat, which can affect the curing time of the ink or paint and add another process variable. Nonetheless, electromagnetic may be useful in some embodiments of the invention.

Figure 9C:
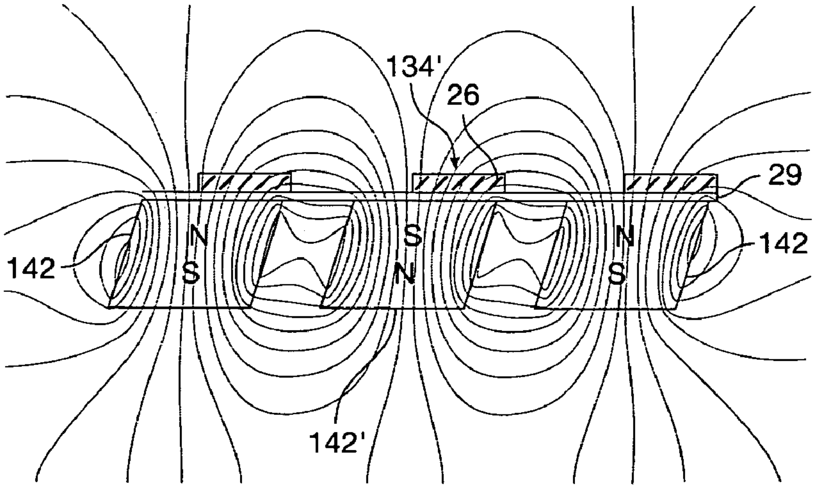
FIG. 9C is a simplified cross section of apparatus according to another embodiment of the present invention.

FIG. 9C is a simplified cross section of an apparatus according to another embodiment of the present invention. Magnets 142, 142' having a diamond-shaped cross section are used to spread the magnetic field and make it wider. The apparatus was modeled with three two-inches by one and a half inches NdFeB magnets arranged one inch from each other. The magnets show a cross-section of a magnetic assembly for re-orientation of flakes in a magnetic field. The substrate 29 moves at a high speed in the direction from the viewer into the drawing. Two magnets have their north pole facing up while the intervening magnet 142' has its south pole facing up. Each magnet has the same field intensity as the magnets illustrated in FIG. 9B, but provides a wider area for placement of the field 134' for orienting the flakes 26.

Figure 9D:
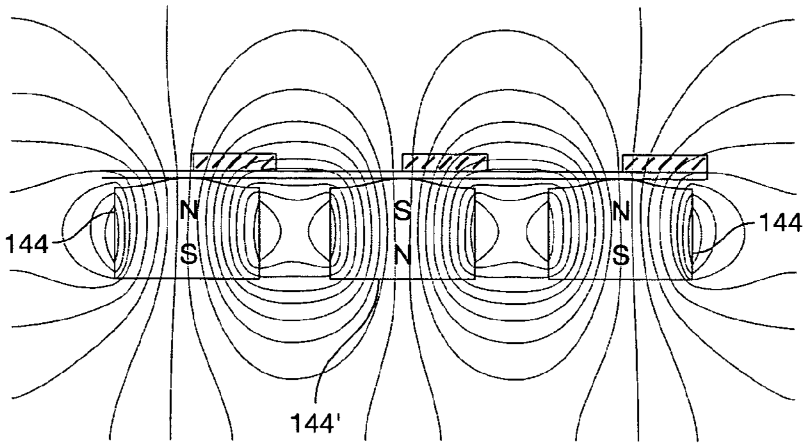
FIG. 9D is a simplified cross section of apparatus according to yet another embodiment of the present invention.

FIG. 9D is a simplified cross section of an apparatus according to yet another embodiment of the present invention. An effect similar to that obtained with the apparatus illustrated in FIG. 9C can be obtained with magnets 144, 144' having a roof-shaped cross-section, as well as with magnets having hexagonal, rounded, trapezoidal, or other cross-sections. Different shapes of magnets provide different performance that can create various printed or painted images with tilted flakes. For example, the magnitude of magnetic field intensity can be very different for magnets having different shapes (cross sections).

Figure 9E:
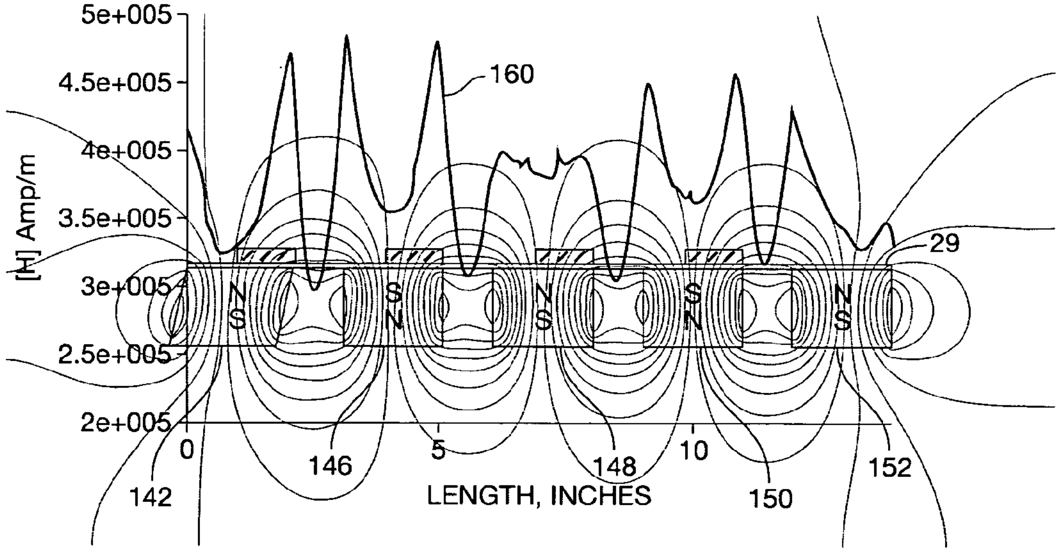
FIG. 9E illustrates the calculated magnetic field intensity for an associated five-magnet apparatus.

FIG. 9E illustrates the calculated magnetic field intensity for a five-magnet apparatus. The first magnet 142 is a diamond-shaped NdFeB 40 MOe magnet with dimensions close to 2" by 1.5" with its north pole facing up. The second magnet 146 is a rectangular 2" by 1.5" NdFeB 40 MOe magnet with its south pole facing the substrate 29. The third magnet 148 is a NdFeB 40 MOe magnet with rounded top. This magnet has its north pole facing the substrate. The fourth magnet 150 has its south pole facing up, and is roof-shaped (with the angle of the tip being about 185°). The fifth magnet 152 is also roof-shaped but the angle of the tip is about 175°. The curve 160 shows the calculated magnitude of magnetic field intensity in this illustrative assembly. Shapes of the field intensity are different for different magnets. The field intensity is low in the center of rectangular, diamond and roof-shaped magnets while it becomes almost flat at 380,000 A/m for the rounded magnet 148. The curve shows that shaping of the magnet helps to get a field intensity that will be enough to provide a torque of the flake to orient it.

Figure 10A:
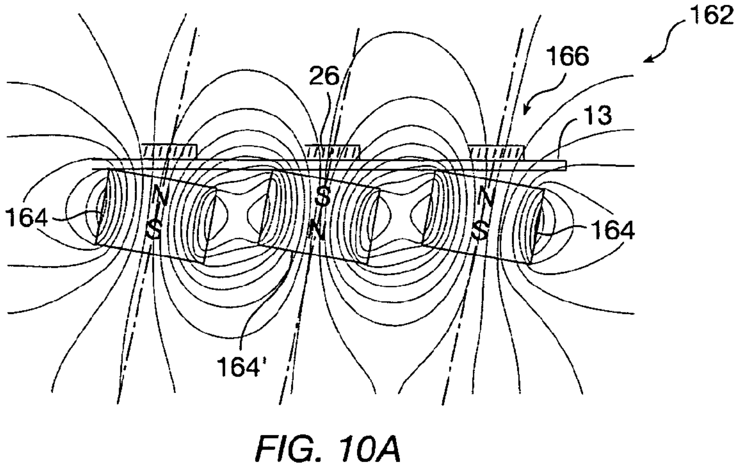
FIG. 10A is a simplified side view of an apparatus for printing illusive images that tilts magnetic flakes in a selected direction according to another embodiment of the present invention.

FIG. 10A is a simplified side view of an apparatus 162 according to an embodiment of the present invention that tilts the flakes in a preferred direction and is suitable for adaptation to a high-speed printing process. Three 2" by 1.5" NdFeB 40 MOe magnets 164, 164' are tilted 10° relative to the substrate 29 and printed images 166. Flakes 26 follow magnetic lines and re-orient themselves. The magnets have the same alignment similar to the alignment shown in FIG. 9D. Two of the magnets 164 have their north poles up and the magnet 164' between them has its south pole facing the substrate 29. The printed images 166 should be placed above the central axis of the magnet to take advantage of the tilted magnetic field lines generated by the tilted magnets. Such arrangement produces uniform tilt of the flake on an area that is larger than for the magnetic assemblies described in reference to FIGS. 9A-9E.

Magnetic lines in the field are not parallel. The difference is minor in the near order and becomes larger with increase of a distance between the lines. It means, that on a large printed image, placed in magnetic field, all flakes would have different tilt resulting in a non-consistent image appearance. The inconsistency can be reduced by deflecting of magnetic lines toward the center of the magnet to keep them more parallel. It is possible to do with small auxiliary magnets.

Figure 10B:
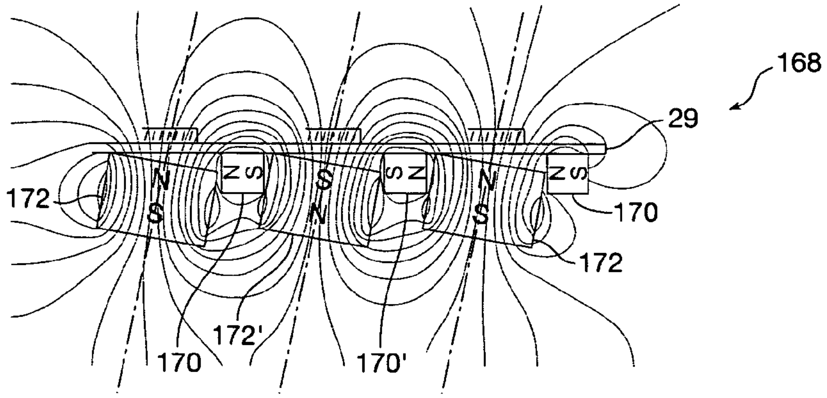
FIG. 10B is a simplified side view of an apparatus for printing illusive images that includes auxiliary magnets according to another embodiment of the present invention.

FIG. 10B is a simplified side view of an apparatus 168 according to an embodiment of the present invention including auxiliary magnets 170, 170'. The tilted primary magnets 172, 172' are arranged similar to the magnets shown in FIG. 10A, with alternating magnets presenting alternating poles (north-south-north) next to the substrate 29. The smaller auxiliary magnets are located beneath the substrate and between the larger primary magnets. The auxiliary magnets are arranged so that the north pole of an auxiliary magnet faces the north pole of a primary magnet, and its south pole faces the south pole of a primary magnet. In such an arrangement, two fields (north-north, south-south) oppose each other and magnetic lines become deflected toward the center of the primary magnets.

Figure 10C:
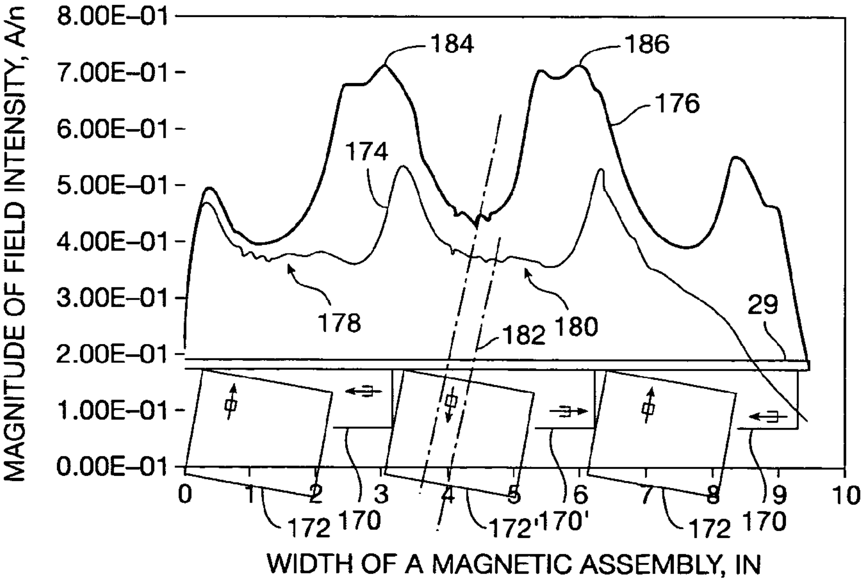
FIG. 10C is a simplified plot illustrating the magnetic field intensity for the apparatus of FIGS. 10A and 10B.

FIG. 10C is a simplified plot showing the calculated field intensity for the magnetic assemblies shown in FIGS. 10A and 10B, represented by curves 174 and 176, respectively. The substrate 29, primary magnets 172, 172' and auxiliary magnets 170, 170' are shown to illustrate how the plots relate to the assembly dimensions, although the auxiliary magnets are only relevant to the plot of the second curve 176. The first curve 174 shows how the magnitude of field intensity of the assembly in FIG. 10A changes in the direction from one edge of the substrate to another. The curve has two minima 178, 180 corresponding to the center of the primary magnets 172, 172'. A central axis 182 of the center magnet 172' shows where the center of the magnet and the plot of field intensity coincide.

Inclusion of the auxiliary magnets 170, 170' in the assembly shifts magnitude of field intensity to the left. The second curve 176 shows magnitude of field intensity of an assembly according to FIG. 10B. The maxima 184, 186 on the curve are shifted to the left relative to the first curve 174 associated with FIG. 10A. This shows that opposing fields on the auxiliary magnets deflect the fields of the primary magnets.

Figure 11A:
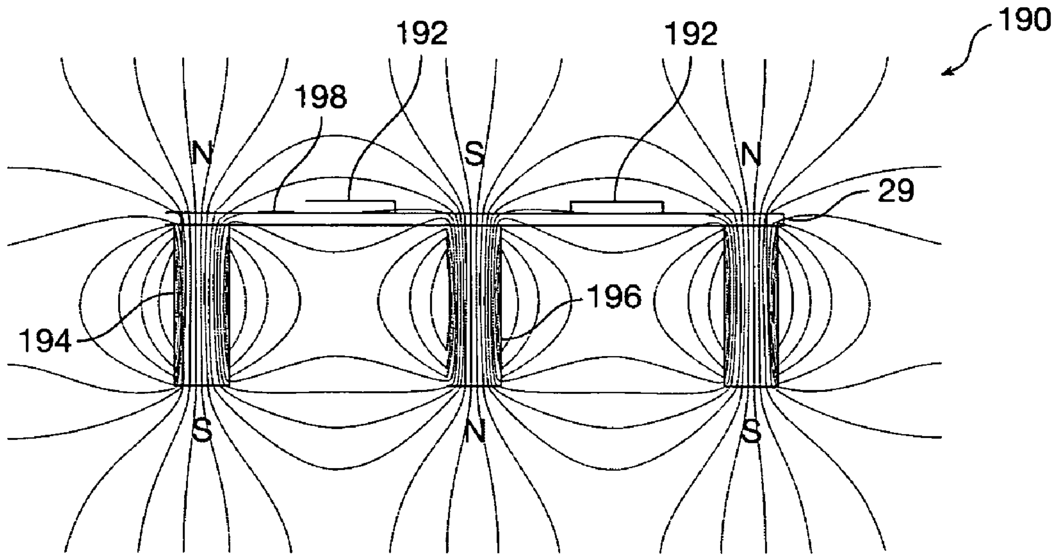
FIG. 11A is a simplified side view of an apparatus for aligning magnetic pigment flakes to the plane of the substrate after printing.

FIG. 11A is a simplified side view of an apparatus 190 for aligning magnetic pigment flakes in printed fields 192 in the plane of a substrate after printing. Magnets 194, 196 are arranged to produce magnetic field lines 198 essentially parallel to the surface of the substrate 29. In some printing processes using pigment flakes, the flakes align essentially parallel to the substrate when applied (printed), but are "pulled" out of plane when the printing screen is lifted, for example. This disorganization of the flakes tends to reduce the visual effect of the print, such as a reduction in chroma.

In one instance, magnetic color-shifting pigment flakes were applied to a paper card using a conventional silkscreen process. The same ink was applied to another paper card, but before the ink carrier dried, a magnet was used to re-orient the flakes in the plane of the card. The difference in visual appearance, such as the intensity of the colors, was very dramatic. Measurements indicated that a 10% improvement in chroma had been attained. This level of improvement is very significant, and it is believed that it would be very difficult to achieve such an improvement through modifications of the pigment flake production techniques, such as changes to the substrate and thin film layers of the flake. It is believed that even greater improvement in chroma is possible, and that a 40% improvement might be obtained when magnetic re-alignment techniques are applied to images formed using an Intaglio printing process.

Figure 11B:
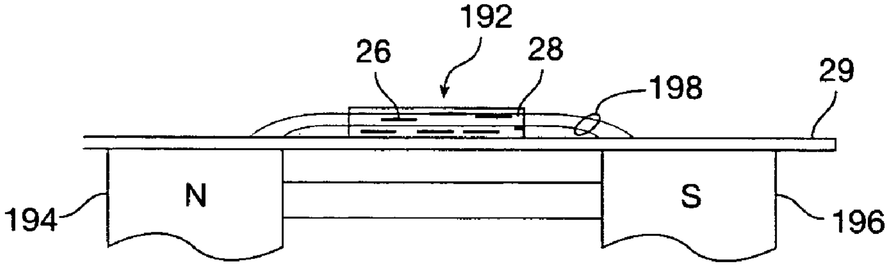
FIG. 11B is a simplified side view of a portion of an apparatus for enhancing the visual quality of an image printed with magnetically alignable flakes.

FIG. 11B is a simplified side view of a portion of an apparatus for enhancing the visual quality of an image printed with magnetically alignable flakes according to another embodiment of the present invention. Magnets 194, 196 create magnetic field lines 198 that are essentially parallel to the substrate 29, which causes the magnetic pigment flakes 26 in the fluid carrier 28 to flatten out. The magnets can be spaced some distance apart to provide the desired magnetic field, and the apparatus can be adapted to an in-line printing process.

Figure 11C:
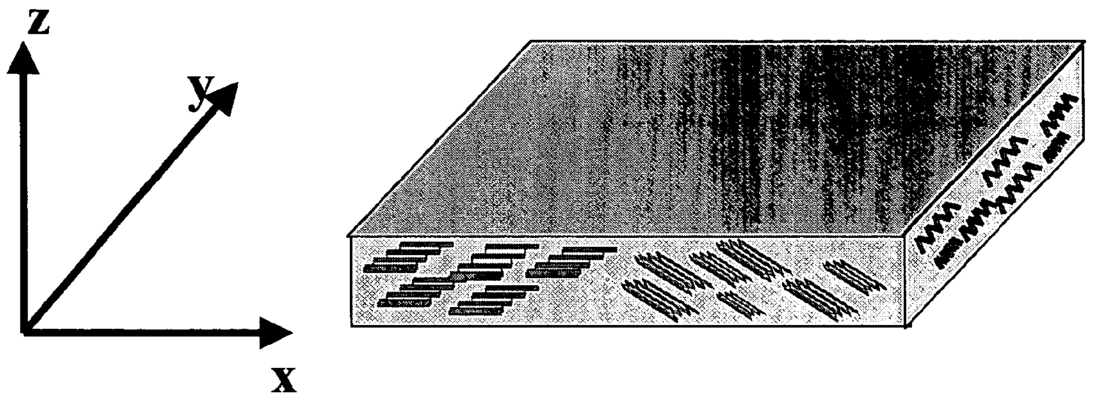
FIG. 11C is a side view of a diffractive magnetic flake in accordance with an embodiment of this invention

FIG. 11C is a side view of a diffractive magnetic flake in accordance with an embodiment of this invention. By using a diffractive pigment, the applied magnetic fields will produce an alignment along the grooves of the diffractive flakes. In this manner, the flakes are aligned creating a condition of light dispersion or diffraction when the incident light is perpendicular to the grooves of the flakes. When the image formed by these aligned diffractive flakes is rotated 90 degrees about a vertical axis, or if the source of illumination is accordingly altered, the dispersion is not longer observable and the ensemble of flakes behaves as a flat pigment. Depending of grating frequency, the dispersion of light and diffraction will be different. For a low frequency grating, there will be multiple diffractive orders that can be superimposed; the observed effect is dark/bright upon rotating the image about a vertical axis by 90 degrees. For high frequencies gratings, there will be only one or a partial diffractive order producing dispersion in the visible. In these instances, the image will display diffractive effects on tilting with respect to the vertical axis in the y direction as defined in FIG. 11*c* about a vertical axis. These effects will disappear on rotating about the vertical axis since the grooves of the flakes will be oriented parallel to the illumination.

IV. Printing with Rotating Magnets.

Figure 12A:
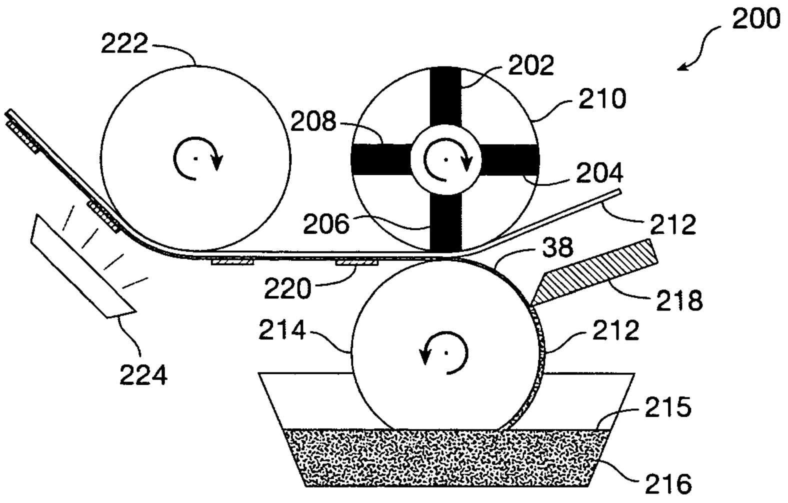
FIG. 12A is a simplified side view schematic of a rolling printing apparatus according to an embodiment of the present invention.

FIG. 12A is a simplified side-view schematic of a portion of a printing apparatus 200 according to an embodiment of the present invention. Magnets 202, 204, 206, 208 are located inside an impression roller 210, forming a pattern that correlates with a printed image. The substrate 212, such as a continuous sheet of paper, plastic film, or laminate, moves between the print cylinder 214 and the impression roller 210 at high speed. The print cylinder takes up a relatively thick layer 212 of liquid paint or ink 215 containing magnetic pigment from a source container 216. The paint or ink is spread to the desired thickness on the print cylinder with a blade 218. During printing of an image between the print cylinder and impression roller, the magnets in the impression roller orient (i.e. selectively align) the magnetic pigment flakes in at least part of the printed image 220. A tensioner 222 is typically used to maintain the desired substrate tension as it comes out of the impression roller and print cylinder, and the image on the substrate is dried with a drier 224. The drier could be heater, for example, or the ink or paint could be UV-curable, and set with a UV lamp.

Figure 12B:
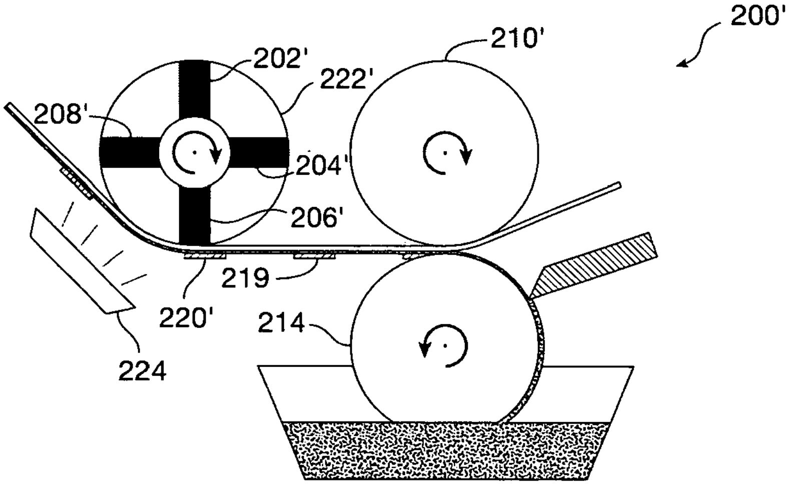
FIG. 12B is a simplified side view schematic of a rolling printing apparatus according to another embodiment of the present invention.

FIG. 12B is a simplified side-view schematic of a portion of printing apparatus 200' according to another embodiment of the present invention. Magnets 202', 204', 206', 208' are installed in the tensioner 222' or other roller. The magnets orient the magnetic pigment flakes in the printed images before the fluid carrier of the ink or paint dries or sets. A field 219 comes off the impression roller 210' and print cylinder 214 with flakes in a non-selected orientation, and a wet image 220' is oriented by a magnet 206' in the tensioner 222' before the flakes are fixed. The drier 224 speeds or completes the drying or curing process.

Figure 12C:
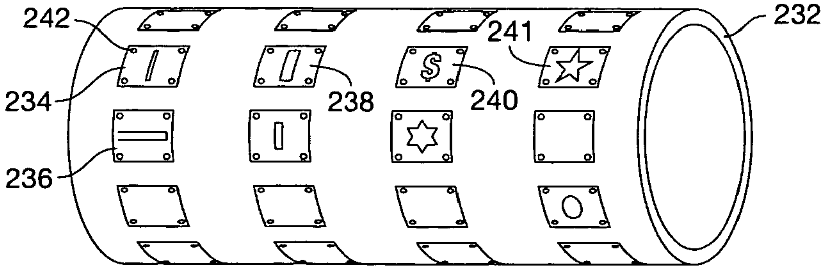
FIG. 12C is a simplified perspective of a rolling drum with magnetic assemblies in accordance with the apparatus illustrated in FIGS. 12A and 12B.

FIG. 12C is a simplified perspective view of a magnetic roller 232 according to an embodiment of the present invention. The roller could be a print cylinder or tensioner, as discussed in conjunction with FIGS. 12A and 12B, or another roller in a printing system that contacts the print substrate before the ink or paint is fixed. Magnetic assemblies 234, 236, 238, 240, 241 are attached to the roller with screws 242, which allow the magnetic assemblies to be changed without removing the roller from the printer. The magnetic assemblies could be configured to produce flip-flop 234, 236 or rolling bar 238 images, or could be patterned magnetic material 240, 241 that produces a patterned image on the printed substrate, or other selected magnetic configuration. The magnetic structures on the roller are aligned to the sheet or roll to provide the desired magnetic field pattern to fields printed on the substrate with magnetic pigment flakes. The illustrated patterns represent flat patterns that follow the curve of the circumference of the roller. Alternatively, the magnetic structure could be built into the roller, or a roller with a suitable surface material could be magnetized in selected patterns.

Figure 12D:
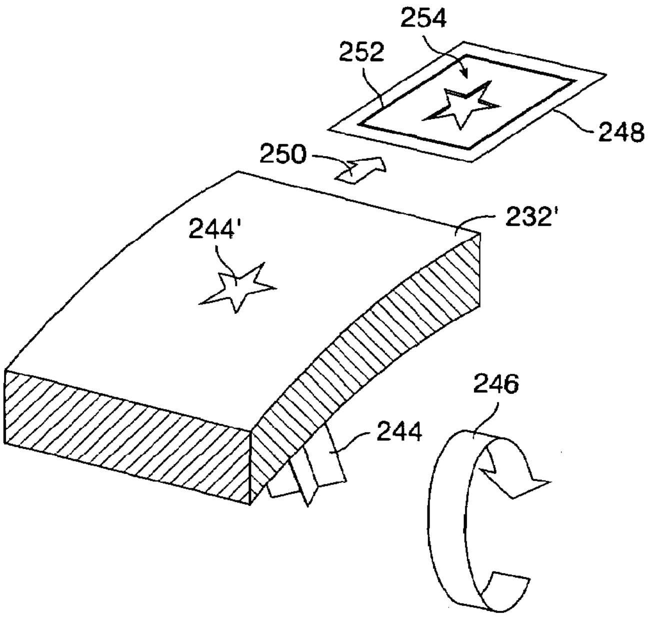
FIG. 12D is a simplified perspective view of a portion of a rolling drum with a magnetically patterned surface, in accordance with an embodiment of the present invention.
Figure 12E:
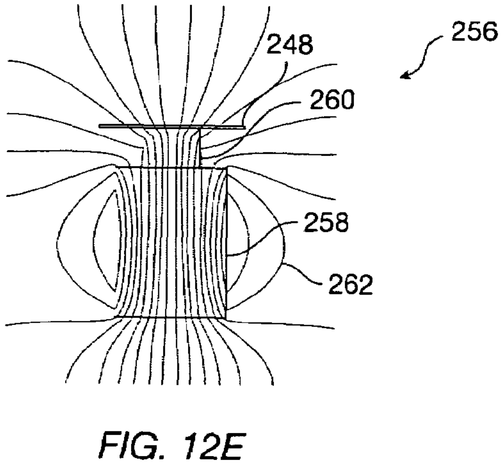
FIG. 12E is a simplified side view of magnetic assembly for printing illusive three-dimensional images according to an embodiment of the present invention.
Figure 12F:
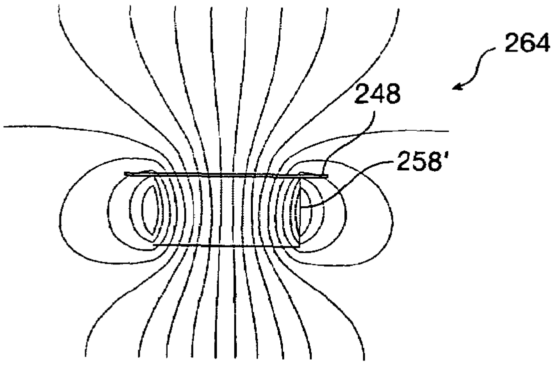
FIG. 12F is a simplified side view of a magnet for printing illusive three-dimensional images according to another embodiment of the present invention.

FIG. 12D is a simplified perspective section of a portion of a roller 232' with a magnetic assembly 244 embedded in the roller. The magnetic assembly has a cross section in the shape of a star, and it surface 244' is essentially flush with the surface of the roller. The magnetic assembly could be shaped permanently magnetized material, as illustrated in FIG. 12F, or have a tip section of SUPERMALLOY, MU-METAL, or similar material, as illustrated in FIG. 12E, below. The roller rotates in the direction of the first arrow 246 and a paper or film substrate 248 travels in the direction of the second arrow 250. A field 252 including magnetic pigment flakes has been printed on the substrate. The field was over the surface of the star-shaped magnetic assembly when the roller was proximate to the substrate, and an illusive optical feature 254 in the shape of a star was formed in the field. In a preferred embodiment, the magnetic pigment flakes are fixed while the magnetic assembly is in contact with the substrate.

The illusive optical effect 254 is a star with an apparent depth much deeper than the physical thickness of the printed field. It was discovered that the type of carrier used with the magnetic pigment flakes can affect the final result. For example, a solvent-based (including water-based) carrier tends to reduce in volume as the solvent evaporates. This can cause further alignment, such as tilting partially tilted flakes toward the plane of the substrate. UV-curable carriers tend not to shrink, and the alignment of the magnetic pigment flakes after contact with the magnetic field pattern tends to be more precisely preserved. Whether it is desired to preserve the alignment, or enhance the alignment by evaporation of the solvent in the carrier, depends on the intended application.

FIG. 12E is a simplified side view of a magnetic assembly 256 with a permanent magnet 258 providing the magnetic field that is directed to the substrate 248 by a patterned tip 260 of SUPERMALLOY or other high-permeability material. The modeled magnetic field lines 262 are shown for purposes of illustration only. Some "supermagnet" materials are hard, brittle, and generally difficult to machine into intricate shapes. SUPERMALLOY is much easier to machine than NdFeB magnets, for example, and thus can provide an intricate magnetic field pattern with sufficient magnetic field strength to align the magnetic pigment flakes in the desired pattern. The low remnant magnetization of SUPERMALLOY and similar alloys make them easier to machine, as well.

FIG. 12F is a simplified side view of a magnetic assembly 264 with a shaped permanent magnet 258'. The entire length of the magnet does not have to be shaped, but only that portion that produces the desired field pattern at the substrate 248. Although some materials that are commonly used to form permanent magnets are difficult to machine, simple patterns may be formed in at least the tip section. Other materials that form permanent magnets are machinable, and may provide sufficient magnetic strength to produce the desired illusive optical effect. Similarly, magnet alloys might be cast or formed into relatively complex shapes using powder metallurgy techniques.

V. Exemplary Methods

Figure 13A:
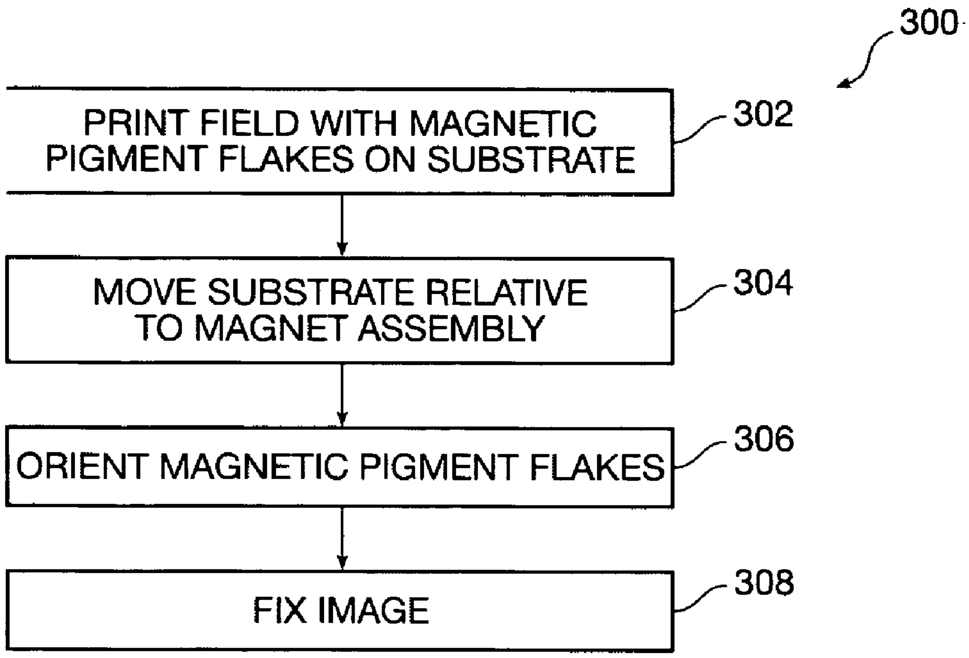
FIG. 13A is a simplified flow chart of a method of printing an image according to an embodiment of the present invention.

FIG. 13A is a simplified flow chart of a method 300 of printing an image on a substrate according to an embodiment of the present invention. A field is printed on a thin planar substrate, such as a sheet of paper, plastic film, or laminate, using magnetic pigment flake in a fluid carrier (step 302). Before the carrier dries or sets, the substrate is moved in a linear fashion relative to a magnet assembly (step 304) to orient the magnetic pigment flakes (step 306). After magnetically orienting the magnetic pigment flakes, the image is fixed (i.e. dried or set) (step 308) to obtain an optically variable image resulting from the alignment of the pigment flakes. Typically, the substrate is moved past a stationary magnet assembly. In some instances, the image may have additional optically variable effects, such as color-shifting. In a particular embodiment, the magnet assembly is configured to provide a flip-flop image. In another embodiment, the magnet assembly is configured to provide a rolling bar image. In some embodiments, the thin planar substrate is a sheet that is printed with several images. The images on the sheet can be the same or different, and different inks or paints can be used to print the images on the sheet. Similarly, different magnetic assemblies can be used to create different images on a single sheet of substrate. In other embodiments, the substrate can be an essentially continuous substrate, such as a roll of paper.

Figure 13B:
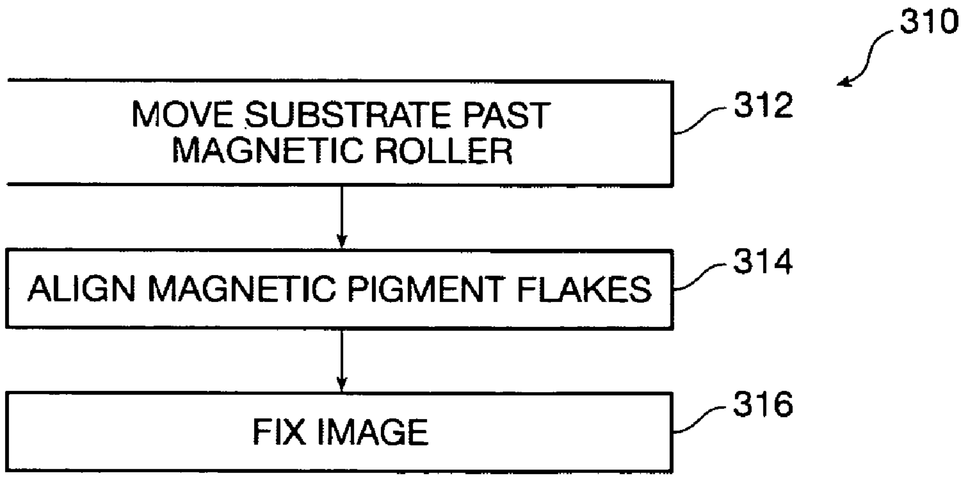
FIG. 13B is a simplified flow chart of a method of printing an image according to another embodiment of the present invention.

FIG. 13B is a simplified flow chart of a method 310 of printing an image on a moving substrate according to another embodiment of the present invention. A substrate is moved past a rotating roller with embedded magnets (step 312) to align magnetic pigment flakes (step 314) that have been applied to the substrate in a fluid carrier. The magnetic pigment flakes are then fixed (step 316) to obtain an optically variable image resulting from the alignment of the pigment flakes. In one embodiment, the magnetic pigment flakes are aligned by magnets in an impression roller as the ink or paint is printed onto the substrate. In another embodiment, the magnetic pigment flakes are aligned by magnets in a subsequent roller, such as a tensioner. After the flakes are aligned the ink or paint is dried or cured to fix the image.

Various magnetic structures may be incorporated into the roller(s), including magnetic structures for forming flip-flop or rolling bar images. Other magnetic structures, such as magnets with a face having a selected shape, can be incorporated into the rollers to provide high-speed printing of optically variable images. For example, a magnet having a ring-shape on its face (the face of the roller) can produce a "fish-eye" effect in a field printed with magnetic pigment flakes. Magnets in the roller(s) could be fashioned into other shapes, such as a star, $ sign, or € sign, for example. Providing the magnets on the tensioner or other roller near the drier can avoid the problems associated with the image in the magnetic pigment flakes being degraded as the image leaves the trailing edge of the face of the magnet. In other embodiments, the tangential separation of the substrate from the magnetic roller avoids degradation of the magnetically aligned image. In alternative embodiments, the substrate could be stationary, and the magnetic roller could be rolled across the substrate.

While the invention has been described above in reference to particular embodiments and the best mode of practicing the invention, various modifications and substitutions may become apparent to those of skill in the art without departing from the scope and spirit of the invention. Therefore, it is understood that the foregoing descriptions are merely exemplary, and that the invention is set forth in the following claims.

We claim:

1. An image printed on a substrate, the image comprising:

a first image portion having magnetic flakes and a second image portion having magnetic flakes, adjacent to the first image portion, having a distinct border therebetween;

wherein the magnetic flakes in the first image portion are tilted in a first direction, parallel to each other, and the magnetic flakes in the second image portion are tilted in a second direction, parallel to each other, the first and second directions forming a "V"-shape, so as to provide the first image portion appearing lighter than the second image portion when viewed from a first viewing direction and the first image portion appearing darker than the second image portion when viewed from a second viewing direction.

2. The image according to claim 1 wherein the magnetic flakes are colored.

3. The image according to claim 1 wherein the magnetic flakes comprise an optical interference structure.

4. The image according to claim 1 wherein the magnetic flakes are dispersed in a tinted carrier.

5. The image according to claim 1 wherein at least some of the magnetic flakes have one or more diffractive structures therein, or thereon.

6. A document comprising:

an illusive image providing a security feature, the illusive image including a first image portion having magnetic flakes and a second image portion having magnetic flakes, adjacent to the first image portion, having a visually distinct border therebetween, wherein the magnetic flakes in the first image portion are tilted in a first direction, parallel to each other, and the magnetic flakes in the second image portion are tilted in a second direction, parallel to each other, the first and second directions forming a "V"-shape, so as to provide the first image portion appearing lighter than the second image portion when viewed from a first viewing direction and the first image portion appearing darker than the second image portion when viewed from a second viewing direction.

7. The document according to claim 6 wherein the document is a bank note.

8. A document as defined in claim 6 wherein at least some of the magnetic flakes are diffractive.

9. A document as defined in claim 8, wherein the diffractive flakes have diffractive structures therein or thereon.

10. A document as defined in claim 6 wherein the first image portion is directly adjacent the second image portion.

11. A document as defined in claim 10 wherein the first image portion and the second image portion form a "flip-flop" so that when the image is tilted back and forth along a line through the first and second image or the direction of a light source incident upon the image is changed from a non-normal direction incident upon the first image portion to a non-normal direction incident upon the second image portion the first image portion and the second image portion appear to have a switching optical effect.

12. A document as defined in claim 10, wherein the first image portion and the second image portion together form a character.

* * * * *